(12) United States Patent
Jang et al.

(10) Patent No.: US 7,221,801 B2
(45) Date of Patent: May 22, 2007

(54) METHOD AND SYSTEM FOR GENERATING INPUT FILE USING META LANGUAGE REGARDING GRAPHIC DATA COMPRESSION

(75) Inventors: Gyeong-ja Jang, Gyeonggi-do (KR); Do-kyoon Kim, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 398 days.

(21) Appl. No.: 10/727,659

(22) Filed: Dec. 5, 2003

(65) Prior Publication Data

US 2004/0111676 A1 Jun. 10, 2004

Related U.S. Application Data

(60) Provisional application No. 60/510,118, filed on Oct. 14, 2003, provisional application No. 60/430,977, filed on Dec. 5, 2002.

(30) Foreign Application Priority Data

Nov. 25, 2003 (KR) ...................... 10-2003-0084216

(51) Int. Cl.
*G06K 9/36* (2006.01)
*G06K 9/46* (2006.01)
*G06T 15/00* (2006.01)
*G06T 17/20* (2006.01)
*G06T 15/70* (2006.01)
*G06T 13/00* (2006.01)
*G06F 7/00* (2006.01)

(52) U.S. Cl. ...................... 382/232; 382/236; 382/243; 345/419; 707/101

(58) Field of Classification Search ................ 345/419; 715/513; 382/232, 236, 243; 707/3, 7, 101
See application file for complete search history.

(56) References Cited

U.S. PATENT DOCUMENTS 5,912,676 A * 6/1999 Malladi et al. ............. 345/531
6,593,936 B1 * 7/2003 Huang et al. ............... 345/619
6,693,645 B2 * 2/2004 Bourges-Sevenier ........ 345/619
6,751,623 B1 * 6/2004 Basso et al. ................ 707/101
6,996,571 B2 * 2/2006 McConnell .................. 707/101

(Continued)

FOREIGN PATENT DOCUMENTS

CN 1316828 A 10/2001
JP 2002-99428 4/2002

OTHER PUBLICATIONS

Cheong et al., "Development of an interactive contents authoring system for MPEG-4", Proceedings of Workshop and Exhibition on MPEG-4, Jun. 18-20, 2001, pp. 17-20.*
Hunter, J., "An overview of the MPEG-7 description definition language (DDL)", IEEE Transactions on Circuits and Systems for Video Technology, vol. 11, Issue 6, Jun. 2001, pp. 765-772.*

(Continued)

*Primary Examiner*—Ulka Chauhan
*Assistant Examiner*—Roberta Prendergast
(74) *Attorney, Agent, or Firm*—Buchanan Ingersoll & Rooney PC

(57) ABSTRACT

Provided are an input file generation method and system using a meta language regarding graphics data compression. The method includes making an extensible markup language (XML) schema that defines at least a compression node describing object data to be compressed, and parameters used to data compression; making style sheets which support conversion of an input XML file into a file, which is to be input to a data compression encoder, based on the XML schema; and generating a file, which is to be input to the data compression encoder, by parsing the input XML file based on the XML schema and the style sheets. Accordingly, an author can easily use and compress three-dimensional (3D) data using the meta language during authoring 3D contents. Further, the author can select a data compression format and controls data compression. Whether data is to be compressed or not and the format of data compression can be determined by representation of the metal language.

34 Claims, 5 Drawing Sheets

U.S. PATENT DOCUMENTS

| | | | |
|---|---|---|---|
| 2001/0010706 A1* | 8/2001 | Sato et al. | 375/240.12 |
| 2002/0009151 A1* | 1/2002 | Gentric | 375/240.26 |
| 2002/0071654 A1* | 6/2002 | Notoya et al. | 386/65 |
| 2002/0083032 A1* | 6/2002 | Bourges-Sevenier | 707/1 |
| 2002/0085028 A1* | 7/2002 | Tabatabai et al. | 345/748 |
| 2003/0031260 A1* | 2/2003 | Tabatabai et al. | 375/240.25 |
| 2003/0103073 A1* | 6/2003 | Yokoyama | 345/716 |
| 2003/0110297 A1* | 6/2003 | Tabatabai et al. | 709/246 |
| 2004/0109502 A1* | 6/2004 | Luken | 375/240.08 |
| 2004/0111677 A1* | 6/2004 | Luken et al. | 715/523 |

OTHER PUBLICATIONS

Kim, T. and Fishwick, P. A., "A 3D XML-based customized framework for dynamic models", Proc. of Seventh international Conference on 3D Web Technology, Feb. 2002, ACM Press, New York, NY, 103-109.*

Kwang-Yong Kim et al., "Design and implementation of MPEG-4 authoring tool", Proc. of Fourth Annual Conference on Computational Intelligence and Multimedia Applications, ICCIMA 2001, Oct. 30-Nov. 1, 2001, pp. 348-351.*

Mukherjee et al., "U-P2P: a peer-to-peer system for description and discovery of resource-sharing communities", Proc. of 22nd International Conference on Distributed Computing Systems Workshops, 2002, pp. 701-705.*

Puri et al., "MPEG-4: an object-based multimedia coding standard supporting mobile applications", The Journal of Mob. Netw. Appl. vol. 3, No. 1 (Jun. 1998), pp. 5-32.*

Widener et al., "Open metadata formats: efficient XML-based communication for heterogeneous distributed systems", 21st International Conference on Distributed Computing Systems, Apr. 16-19, 2001, pp. 739-742.*

Mikael Bourges-Sevenier (Mindego) et al., "Study of FPDAM of ISO/IEC 14496-1/AMD4", MPEG-4 Systems, International Organisation for Standardisation, ISO/IEC JTC1/SC29/WG11 N5285, Coding of Moving Pictures and Audio, 2002, pp. 1-36, Shanghai, China.

Mikael Bourges-Sevenier (Mindego) et al, "FDAM of ISO/IEC 14496-11/AMD1", MPEG-4 Systems, International Organisation for Standardisation, ISO/IEC JTC1/SC29/WG11, N5480, Coding of Moving Pictures and Audio, 2002, pp. 1-157, Awaji, Saudi Arabia.

ISO/IEC, "Information Technology- Coding of Audio-Visual Objects", Part 1: Systems, WD3.0 ISO/IEC 14496-1, MPEG-4 3rd Edition, 2002, N5065, Aug. 2002.

Searh Report issued by the European Patent Office on May 18, 2004.

Han, Mahnjin, "ISO/IEC 14496-11/PDAM4 (XMT & MPEG-J Extensions in corresponding application EP 03 25 7606", International Organization For Standardization, Jan. 4, 2004, pp. 1-34.

Kim et al., "Study Text of ISO/IEC 14496-1:2001/FDAM2", MPEG-4 Systems, Mar. 2002, pp. 1-91.

Bourges-Sèvenier et al., "FDAM of ISO/IEC 14496-11/AMDI", International Organization For Standardization, Dec. 2002, pp. I-173.

Kim et al., "Interactive Contents Authoring System based on XMT and BIFS", International Conference On Multimedia, Dec. 1, 2002, pp. 275-278.

Kim et al., "Extensible MPEG-4 Textual Format (XMT)", International Multimedia Conference, NY,NY; vol. Conf. 8; Nov. 4, 2000, pp. 71-74.

Joung et al., "XMT Tools For Interactive Broadcasting Contents Description", International Workshop On Digital And Computational Video, Nov. 14, 2002, pp. 184-191.

Chinese Office Action dated Apr. 15, 2005 and English Translation.

"Novel Technique of Information Representation and Processing Provided for Web by XML Language and Extension", Beijing Broadcasting University Academic Journal (Nature and Science),Edition 1, 2001.

Japanese Office Action dated Mar. 15, 2006.

* cited by examiner

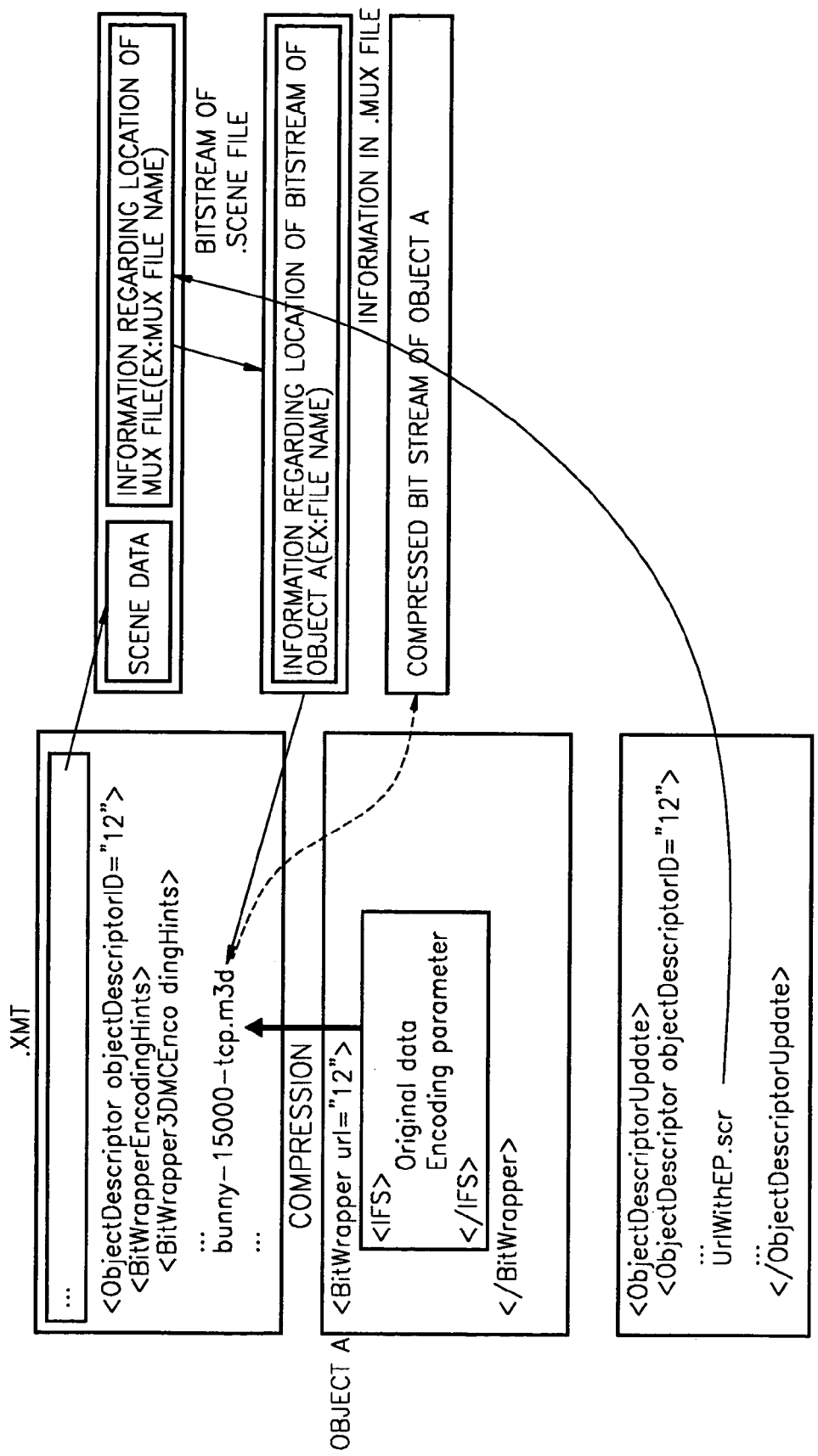

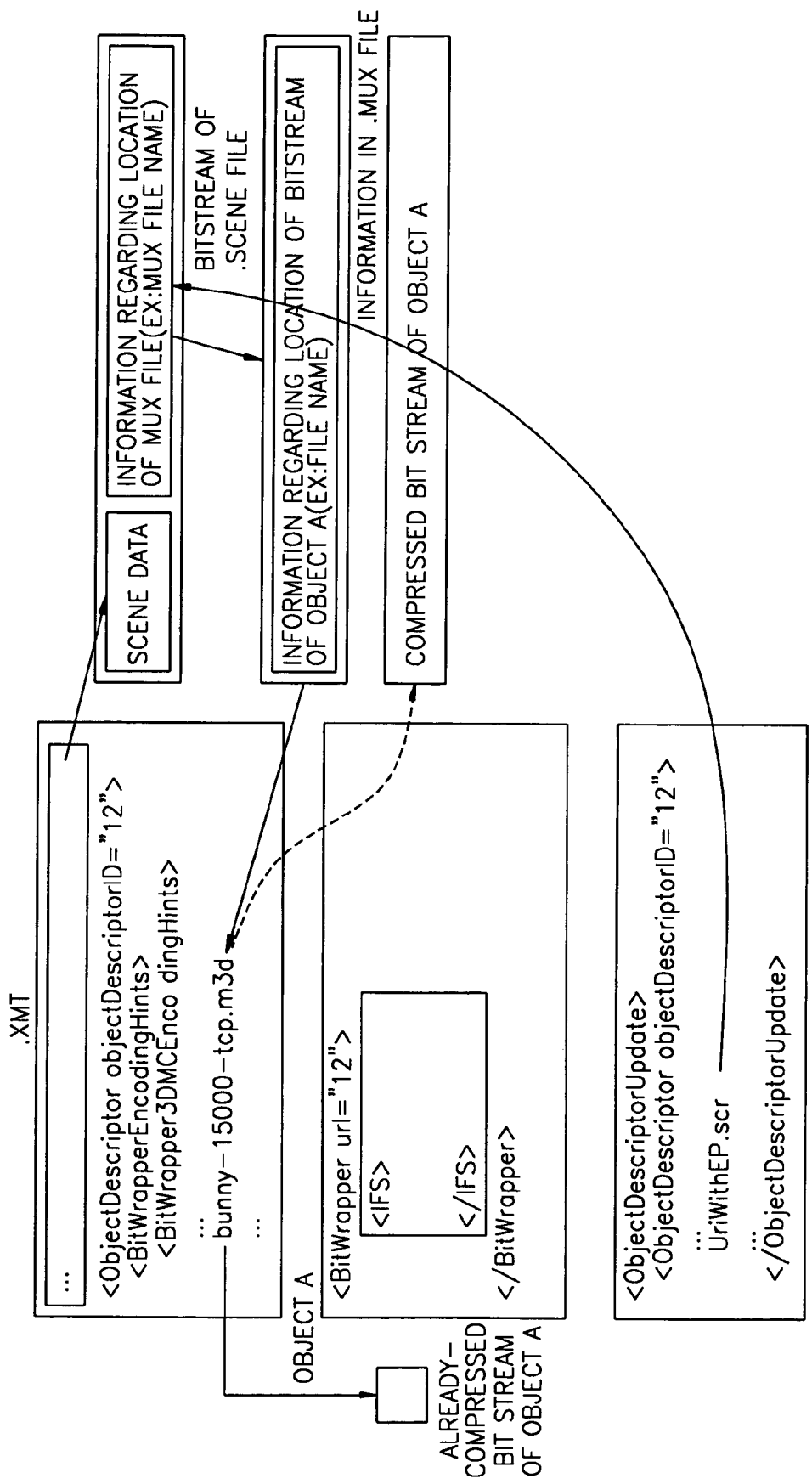

METHOD AND SYSTEM FOR GENERATING INPUT FILE USING META LANGUAGE REGARDING GRAPHIC DATA COMPRESSION

BACKGROUND OF THE INVENTION

This application claims the priorities of Korean Application No. 2003-84216 filed on Nov. 25, 2003 in the KIPO, and US Provisional Application No. 60/430,977 filed on Dec. 5, 2002 and US Provisional Application No. 60/510,118 filed on Oct. 14, 2003 in the USPTO, the disclosures of which are incorporated herein in their entirety by reference.

1. Field of the Invention

The present invention relates to graphics data writing, and more particularly, to a method and system for generating an input file using a meta language regarding graphics data compression.

2. Description of the Related Art

A conventional Extensible MPEG-4 Textual format technique (hereinafter referred to as 'XMT') enables representation of MPEG-4 primitives, e.g., two-dimensional (2D) or three-dimensional (3D) graphics, audio, and video, such that an author can easily and conveniently process them. Also, a content authoring framework has been designed to allow data made by an author to be reused in various applications and enable data compatibility and portability. The reuse of data and data compatibility and portability can be realized because extensible Markup Language (XML) syntaxes related to MPEG-4 primitives are defined in the conventional XMT.

However, since the conventional XMT does not treat compression of 3D data, it is difficult to compress animation data and representation data related to 3D contents made by an author.

SUMMARY OF THE INVENTION

The present invention provides a method and apparatus for generating an input file using a meta language regarding graphics data compression so as to easily compress graphics data during an authoring step.

The present invention also provides a method and system for generating an input file using a meta language regarding graphics data compression, the method and system defining representation of compressed data, which is suggested by MPEG-4 AFX, using the XMT so as to easily compress graphics data during an authoring step.

According to an aspect of the present invention, there is provided a method of generating an input file using a meta language regarding graphics data compression, the method comprising making an extensible markup language (XML) schema that defines at least a compression node describing object data to be compressed, and parameters used to data compression; making style sheets which support conversion of an input XML file into a file, which is to be input to a data compression encoder, based on the XML schema; and generating a file, which is to be input to the data compression encoder, by parsing the input XML file based on the XML schema and the style sheets. It is preferable that the XML schema further comprises at least EncodingHints specifying the location of a file in which the object data to be compressed is stored. It is preferable that the parameters comprise at least one of a parameter for keyframe-based animation data regarding vertex coordinates of the object, the rotation information of the object, the position information of the object to be compressed, and a parameter for three-dimensional (3D) mesh information of an object to be compressed.

The vertex coordinates of an object are the data of coordinate interpolator representing the location of an object using coordinates of a vertex consisting of x, y, and z components in a keyframe-based graphic animation. The rotation information of an object is the data of orientation interpolator in a keyframe-based graphic animation. The position information of an object is the data of position interpolator in a keyframe-based graphic animation.ccording to another aspect of the present invention, there is provided a method of generating an input file using a meta language regarding graphics data compression, the method comprising: making an XMT schema which defines a compression node, which defines object data to be compressed, parameters for data compression, and BitWrapperEncodingHints which at least specifies the location of a file in which the object data to be compressed is stored; making an XMT2BIFS style sheet which supports conversion of an XMT input file into an scene file and an XMT2MUX style sheet which supports conversion of the XMT input file into a mux file, based on the XMT schema; and generating the scene file and the mux file by parsing the input XMT file using the XMT schema and the XMT2BIFS and XMT2MUX style sheets. It is preferable the compression node comprises a node field containing the object data to be compressed; a buffer field which is not used together with an url field at the same time and temporarily stores a bitstream defined in the compression node using an in-band scenario; and the url field which is not used together with the buffer field at the same time and links information regarding the bitstream defined in the compression node using an out-band scenario. It is preferable that the compression node further comprises a type field specifying the type of node compression scheme. It is preferable that the parameters comprise at least one of a parameter for keyframe-based animation data regarding vertex coordinates of the object, the rotation information of the object, position information of the object to be compressed, and a parameter for 3D mesh information of an object to be compressed.

It is preferable that the BitWrapperEncodingHints further specifies an object descriptor ID that is the same as a URL ID, of the compression node, the name of a file storing a compressed bitstream, and the type of a stream format, the file name being described in the mux file. Preferably, parsing the input XMT file further comprises receiving the input XMT file describing the compression node that defines the original data, compression parameters, and buffer; and generating the scene file and the mux file by parsing the input XMT file using the XMT schema and the XMT2BIFS and XMT2MUX style sheets, wherein the scene file comprises the original data, compression parameters, and buffer which temporarily stores a bitstream obtained from compression of the original data, and the mux file describes the name of a file obtained by encoding the scene file using a BIFS encoder and a stream format. Preferably, parsing the input XMT file further comprises receiving the input XMT file defining the compression node containing the buffer temporarily storing the compressed object data; and generating the scene file and the mux file by parsing the input XMT file using the XMT schema and the XMT2BIFS and XMT2MUX style sheets, wherein the scene file contains the buffer temporarily storing the bitstream that is representation of the compressed object data, and the mux file specifies the name of a file obtained by encoding the scene file using the BIFS encoder, and the stream format. Preferably, parsing the input XMT file comprises receiving the input XMT file which describes the compression node defining the original data, compression parameters, and url information, and the BitWrapperEncodingHints defining object descriptor ID that is the same as an url ID the compression node and the location of the bitstream that is representation of the compressed object data; and generating the scene file and the mux file by parsing the input XMT file using the XMT schema and the XMT2BIFS and XMT2MUX style sheets, wherein the scene file contains the original data, compression parameters, and url information which links information regarding the bitstream obtained from compression of the original data, and the mux file specifies the location of the bitstream, which is representation of the compressed object data, and the stream format defined in the BitWrapperEncodingHints. It is preferable that the input XMT file further comprises an ObjectDescriptorUpdate which defines an object descriptor ID that is the same as the object descriptor ID specified in the BitWrapperEncodingHints, and the name of a mux file to be generated from the parsing of the input XMT file, wherein the scene file further specifies an object descriptor ID that is the same as the object descriptor ID specified in the BitWrapperEncodingHints, and the name of the mux file.

It is preferable that parsing the input XMT file further comprises receiving the input XMT file describing the BitWrapperEncodingHints specifying the compression node defining the url which links information regarding already-compressed object data, an object descriptor ID that is the same as the url ID, and the location of the bitstream that is representation of the compressed object data; and generating the scene file and the mux file by parsing the input XMT file using the XMT schema and the XMT2BIFS and XMT2MUX style sheets, wherein the scene file containing the URL which links information regarding the bitstream obtained from the compression of the original data and whose ID is the same as the ID of the object descriptor specified in the compression node, and the mux file specifies the location of the bitstream that is representation of the compressed object data defined in the BitWrapperEncodingHints and the stream format. Also, it is preferable that the input XMT file further comprises an ObjectDescriptorUpdate which specifies an object descriptor ID that is the same as the object descriptor ID defined in the BitWrapperEncodingHints and the name of the mux file obtained by the parsing of the input XMT file, wherein the scene file further specifies an object descriptor ID that is the same as the object descriptor ID defined in the BitWrapperEncodingHints and the name of the mux file.

According to yet another aspect of the present invention, there is provided a system for generating an input file using a meta language regarding graphics data compression, the system comprising an XML schema that defines a compression node at least containing information regarding object data to be compressed and parameters used for data compression; style sheets which support conversion of the input XML file into a file which is to be input to a predetermined data compression encoder, based on the XML schema; and an XML parser which parses the input XML file based on the XML schema and the style sheets to generate a file input to a predetermined data compression encoder. Preferably, the parameters comprises at least one of a parameter for keyframe-based animation data regarding vertex coordinates of the object, a parameter for rotation information of the object, a parameter for position information of the object to be compressed, and a parameter for 3D mesh information to be compressed, According to still another aspect of the present invention, there is provided a system for generating an input file using a meta language regarding graphics data compression, the system comprising: an XMT schema which defines a compression node specifying object data to be compressed, parameters for data compression, and a BitWrapperEncodingHints which at least specifies the location of a file in which the object data to be compressed is stored; an XMT2BIFS style sheet which supports conversion of an input XMT file into a scene file based on the XMT schema; an XMT2MUX style sheet which supports conversion of the input XMT file into a mux file based on the XMT schema; and an XMT file which parses the input XMT file using the XMT schema and the XMT2BIFS and XMT2MUX style sheets to generate the scene and mux files.

It is preferable that the compression node comprises a node field specifying the object data to be compressed; a buffer field which is not used together with a url field at the same time and transmits a bitstream that is representation of the compressed object data using the in-band scenario, the bitstream specified in the compression node; and the url field which is not used together with the buffer field at the same time and transmits the bitstream that is representation of the compressed object data using the out-band scenario, the bitstream being specified in the compression node. It is preferable that the parameters comprise at least one of a parameter for keyframe-based animation data regarding vertex coordinates of the object, the rotation information of the object, the position information of the object to be compressed, and a parameter for 3D mesh information of the object to be compressed.

It is preferable that BitWrapperEncodingHints further comprises an object descriptor ID that is the same as an URL ID defined in the compression node, the name of a file storing the compressed bitstream contained in the mux file, and the type of the stream format.

According to still another aspect of the present invention, there is provided a computer readable recording medium for recording a program executing the above methods in a computer.

BRIEF DESCRIPTION OF THE DRAWINGS

The above and other aspects and advantages of the present invention will become more apparent by describing in detail preferred embodiments thereof with reference to the attached drawings in which:

FIG. 6 illustrates compression of 3D data regarding the object A into a bitstream using parameters and transmission of the bitstream using an Uniform Resource Locator (URL) as defined in a "BitWrapper" node; and FIG. 7 illustrates transmission of 3D data regarding the object A using an already-compressed bitstream using the URL as defined in the "BitWrapper" node.

DETAILED DESCRIPTION OF THE INVENTION

An input file generating system using a meta language regarding graphics data compression will now be described in a greater detail with reference to the accompanying drawings.

Figure 3:
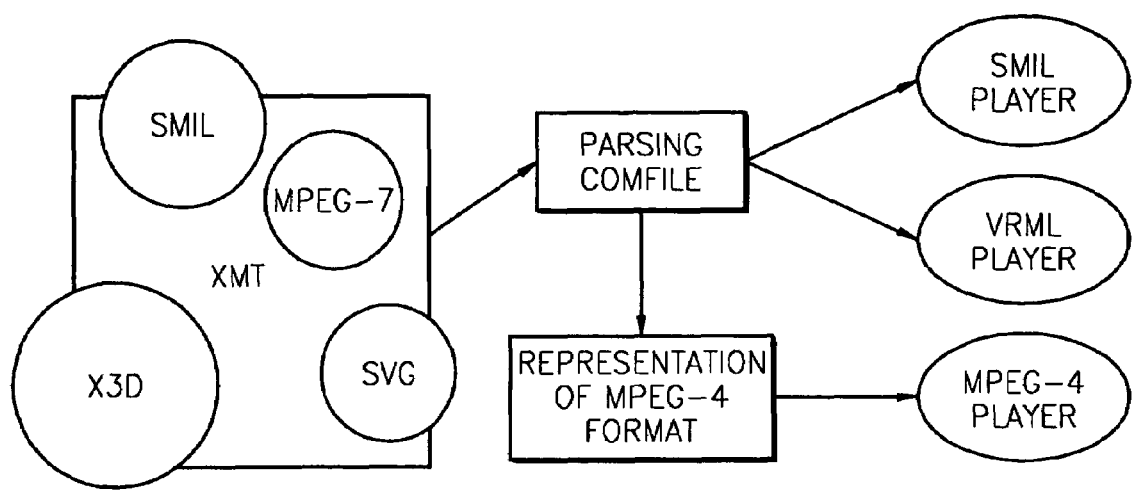
FIG. 3 illustrates an XMT framework of an MPEG-4 scene description using a textual syntax.

A method of adjusting factors needed to author, represent, process, and compress three-dimensional (3D) contents is required for an author to easily process compressed 3D data. Such factors can be adjusted using XMT. The XMT is a framework used to author MPEG-4 contents such as audio, video, two-dimensional (2D) contents, and 3D contents. Also, the XMT is a framework that is representation of MPEG-4 scene description using a textual syntax. The framework is illustrated in FIG. 3. The XMT allows content authors, tools, and service providers to reuse contents made by another content author and further makes it be interoperable with an eXtensible 3D (X3D) language, a Synchronized Multimedia Integration Language (SMIL), an MPEG-7 standard, and a Scalable Vector Graphics (SVG) language.

As illustrated in FIG. 3, an XMT format can be exchanged among an SMIL player, a Virtual Reality Modeling Language (VRML) player, and an MPEG-4 player, and played by these players. More specifically, referring to FIG. 3, the XMT format may be parsed and played by the SMIL player, played by the VRML player after preprocessing X3D contents, or be played by the MPEG-4 player after compiling representation of MPEG-4 (mp4) format.

The XMT format is presented in the dual construction of an XMT-A format and an XMT-Ω format. The XMT-A format is an XML-based version of MPEG-4 contents that is representation of audio, video, 2D or 3D graphics data, or compression thereof, and includes extended 3D graphics (X3D). The XMT-A format further includes an X3D format that is an extension of the XMT-A format to represent MPEG-4 characteristics. A textual format and a binary format are mapped at a ratio of 1:1 in the XMT-A format.

The XMT-Ω format is a high-rank representation of the MPEG-4 characteristics based on the SMIL. The XMT can be default-mapped from the XMT-Ω format into the XMT-A format even if a content author is not familiar with a mechanism from Ω to A. The XMT-Ω format provides interface presentation functions that enable a user to easily and conveniently author contents. In general, MPEG-4 data is presented, processed, and compressed in the XMT-A format.

Accordingly, a compression technique of adjusting factors needed to author, represent, process, and compress 3D data must be defined in the XMT-A format so as to make it possible for an author to compress 3D data.

In other words, it is possible to compress animation data and representation data related to 3D contents made by the author, since representation of compressed data, which is suggested MPEG-4 AFX, is defined in the XMT format. Thus, the author can compress 3D data based on this definition and send the compression. That is, factors required to compress 3D data such as animation data or representation data are defined with parameters in the XMT format. According to the present invention, the factors for compression of the 3D data are defined in an XMT-A schema, using a node that represents compression of the 3D data.

In the present invention, a method of representing the factors for compression of 3D data using a meta language is provided and the 3D data is compressed based on the method.

Figure 1:
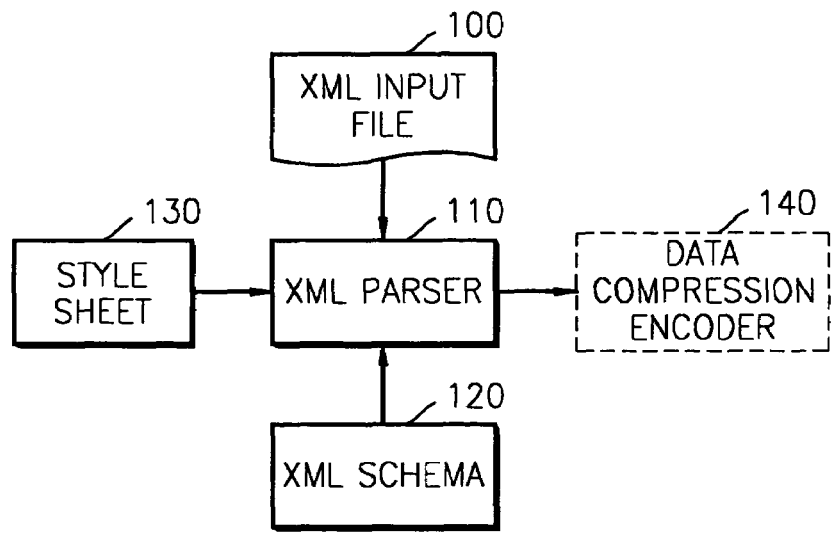
FIG. 1 is a block diagram of an input file generating system using a meta language regarding graphics data compression, according to a preferred embodiment of the present invention.

FIG. 1 is a block diagram of an input file generating system using a meta language regarding graphics data compression. The system of FIG. 1 includes an XML parser 110, and an XML schema 120, a style sheet 130. The XML schema 120 defines compression node containing information regarding object data to be compressed, and data compression parameters. The style sheet 130 supports conversion of an XML input file into a file output to a data compression encoder 140, based on the XML schema 120. The XML 110 parses an XML input file 100 using the XMT schema 120 and the style sheet 130 and generates the file output to the data compression encoder 140.

Figure 2:
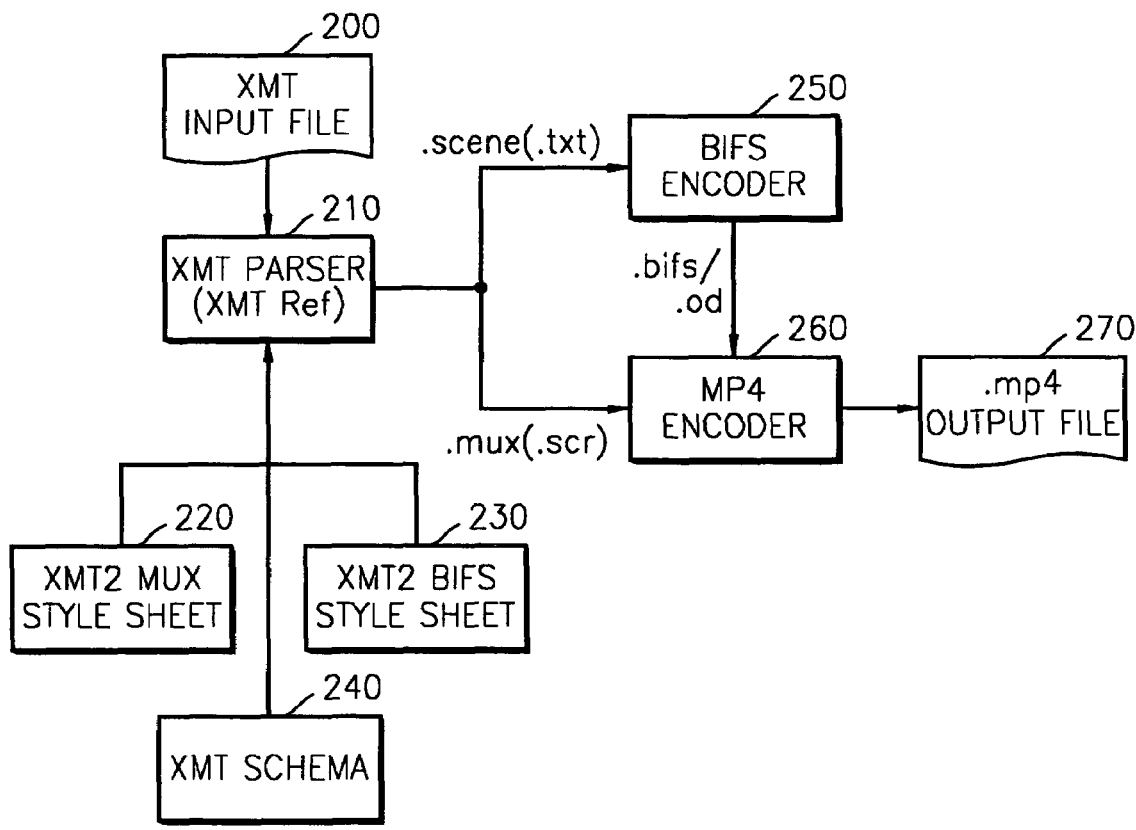
FIG. 2 is a block diagram of an input file generating system that uses a meta language regarding graphics data compression, according to another embodiment of the present invention.

FIG. 2 is a block diagram of another embodiment of the input file generating system, of FIG. 1, which uses a meta language regarding graphics data compression. In detail, the system of FIG. 2 defines representation of compressed data, which is suggested by the MPEG-4 AFX, in the XMT format using the meta language, thus enabling compression of graphics data.

The system of FIG. 2 includes an XMT parser 210, an XMT2MUX style sheet 220, an XMT2BIFS style sheet 230, and an XMT schema 240. The XMT schema 240 defines a compression node containing information regarding object data to be compressed, data compression parameters, and BitWrapperEncodingHints containing information specifying the location of the compressed object data. The XMT2BIFS style sheet 230 supports conversion of an XMT input file 200 to a scene file, based on the XMT schema 240. The XMT2MUX style sheet 220 supports conversion of the XMT input file 200 into a multiplexing (MUX) file, based on the XMT schema 240. The XMT parser 210 parses the XMT input file 200 using the XMT schema 240, the XMT2BIFS style sheet 230, and the XMT2MUX style sheet 220 and generates a scene file and an MUX file.

The compression node is not compatible with a node field containing object data to be compressed, a buffer field that is not compatible with a Uniform Resource Locator (URL) field and transmits a bitstream defined in the node using an in-band scenario, and the URL field that is not compatible with the buffer field and transmits a compressed bitstream contained in the node using an out-band scenario. The data compression parameters may include at least one of a parameter for keyframe-based animation data regarding vertex coordinates of the object, a parameter for rotation information of the object, a parameter for the position information of an object to be compressed, and a parameter for 3D mesh information to be compressed. The BitWrapperEncodingHints further contains information regarding an object descriptor ID such as an URL ID of the compression node, the name of a file that stores compressed bitstreams, the file being included in the MUX file, and the types of stream formats.

The system of FIG. 2 will now be described in a greater detail. First, the compression node containing 3D data to be compressed, and data compression method using an XMT-A schema regarding the parameter of the compression node will be described.

The existing XMT technique is not capable of parsing an input XMT file regarding 3D data compression due to the absence of a definition of the XMT-A schema regarding 3D data compression. However, according to the present invention, as shown in FIG. 2, the XMT-A schema 240 contains definitions of the compression node regarding 3D data compression and related parameters. Thus, the XMT parser 210 can parse the input XMT file 200, which defines 3D data compression using the compression node, based on the definitions in the XMT-A schema 240, the XMT2MUX style sheet 220, and the XMT2BIFS style sheet 230, and generate a file output to an MPEG-4 encoder. The MPEG-4 encoder includes a BIFS encoder 250 and an MP4 encoder 260. When the generated file is input to the BIFS encoder 250 and the MP4 encoder 260, an .mp4 bitstream is generated, and an .mp4 output file 270 is visualized by an MPEG-4 player (not shown), and displayed on a display.

Whether 3D data is to be compressed or not during an authoring process can be determined by an author when using the compression node and meta language-based parameters regarding the 3D data, i.e., the XMT-A schema defining the 3D compression node and parameters. If the 3D data is determined to be compressed, the parameters must be presented using the meta language.

If the author determines to compress the 3D data, the 3D data can be transmitted while adjusting the parameters, using one of the following two ways of: (i) compressing the 3D data into a bitstream and transmitting the bit steam; and (ii) transmitting the 3D data using an already-compressed bitstream.

The above ways are subdivided into the following four ways: (i) the original data is compressed into a bitstream using parameters and the bitstream is transmitted using a buffer; (ii) the original data is transmitted using an already-compressed bitstream using a buffer; (iii) the original data is compressed into a bitstream using parameters and the bitstream is transmitted using a URL; and (iv) the already-compressed bitstream is transmitted using the URL. The author can transmit the 3D data using one of the above four ways.

Next, a method of representing factors used to compress 3D data in the XMT format using the meta language will now be described. In the method, the compression node and parameters regarding compression of the 3D data are presented using the meta language. In this disclosure, the method will be described with respect to a "BitWrapper" node and parameters required for the 3D data compression.

1. XMT-A Schema Regarding BitWrapper Node
1.1 BIFS Syntax Regarding BitWrapper Node

```
BitWrapper { #%NDT=SF2DNode,SF3DNode,SFGeometryNode
    field   SFWorldNode   node     NULL
    field   SFInt32       type     0
    field   MFUrl         url      []
    field   SFString      buffer   ""
}
```

In brief, the "BitWrapper" node defines compression of data, which is contained in a node field, into a bitstream and transmission of the bitstream using an in-band scenario or an out-band scenario. The "uri" field defines transmission of the data as an out-band bitstream, and the "buffer" field defines transmission of the data as an in-band bitstream such as a BIFS bitstream.

If the author compresses and transmits the data as defined in the "BitWrapper" node, the author must adjust parameters used to generate a bitstream. The adjustment of parameters can be made using an XMT-A schema syntax. However, since the parameters are related to a decoding syntax other than a particular encoding syntax, they can be adjusted during data compression. The "BitWrapper" node has supported transmission of a bitstream compressed using seven compressing tools.

Next, XMT-A schema syntax regarding parameters for the "BitWrapper" node and three "CoordinateInterpolator", "OrientationInterpolator", and "PositionInterpolator" nodes regarding 3D key frame animation data, and an "IndexedFaceSet" node that is representation of 3D mesh information will be described.

1.2 XMT-A Schema regarding "BitWrapper" Node
1.2.1 Syntax

```
<?xml version="1.0" encoding="UTF-8"?>
<schema xmlns="http://www.w3.org/2001/XMLSchema"
    xmlns:xmta="urn:mpeg:mpeg4:xmta:schema:2002"
    targetNamespace="urn:mpeg:mpeg4:xmta:schema:2002"
    elementFormDefault="qualified">
<element name="BitWrapper">
  <complexType>
    <element name="node" minOccurs="0" form="qualified">
      <complexType>
        <group ref="xmta:SFWorldNodesType" minOccurs="0"/>
      </complexType>
    </element>
    <choice>
      <element name="CoordinateInterpolatorEncodingParameter" minOccurs="0" maxOccurs="1">
        <complexType>
          <attribute name="keyQbits" "type="xmta:numOfKeyQBits" use="optional" default="8"/>
          <attribute name="keyValueQBits" type="xmta:numOfKeyValueQBits" use="optional" default="16"/>
          <attribute name="transpose" type="xmta:transposeType" use="optional" default=""ON""/>
          <attribute name="linearKeycoder" type="xmta:linearKeycoderType" use="optional" default=""LINEAR""/>
        </complexType>
      </element>
      <element name="IndexedFaceSetEncodingParameter" minOccurs="0" max
```

-continued

```
Occurs="1">
        <complexType>
            <attribute name="coordQBits" type="xmta:numOfCoordQBits" use=
"optional" default="10"/>
            <attribute name="normalQBits" type="xmta:numOfNormalQBits" use=
"optional" default="9"/>
            <attribute name="colorQBits" type="xmta:numOfColorQBits" use="optional"
default="6"/>
            <attribute name="texCoordQBits" type="xmta:numOftexCoordQBits"
use="optional" default="10"/>
            <attribute name="coordPredMode" type="xmta:coordPredType" use
="optional" default="2"/>
            <attribute name="normalPredMode" type="xmta:normalPredType"
use="optional" default="0"/>
            <attribute name="colorPredMode" type="xmta:colorPredType" use
="optional" default="0"/>
            <attribute name="texCoordPredMode" type="xmta:texCoordPredType"
use="optional" default="0"/>
            <attribute name="errorResilience" type="xmta:errorResilienceType"
use="optional" default=""OFF""/>
            <attribute name="bitsPerPacket" type="xmta:SFInt32" use="optional"
default="360"/>
            <attribute name="boundaryPrediction" type="xmta:boundaryPrediction
Type" use="optional" default="0"/>
        </complexType>
    </element>
    <element name="OrientationInterpolatorEncodingParameter" minOccurs="0"
maxOccurs="1">
        <complexType>
            <attribute name="keyQBits" type="xmta:numOfKeyQBits" use=
"optional" default="8"/>
            <attribute name="keyValueQBits" type="xmta:numOfKeyValueQBits"
use="optional" default="16"/>
            <attribute name="preservingMode" type="xmta:preservingType" use
="optional" default=""KEY""/>
            <attribute name="dpcmMode" type="xmta:orientationDpcmType"
use="optional" default="0"/>
            <attribute name="aacMode_X" type="xmta:aacType" use="optional"
default=""BINARY""/>
            <attribute name="aacMode_Y" type="xmta:aacType" use="optional"
default=""BINARY""/>
            <attribute name="aacMode_Z" type="xmta:aacType" use="optional"
default=""BINARY""/>
            <attribute name="linearKeycoder" type="xmta:linearKeycoderType"
use="optional" default=""LINEAR""/>
        </complexType>
    </element>
    <element name="PositionInterpolatorEncodingParameter" minOccurs="0"
maxOccurs="1">
        <complexType>
            <attribute name="keyQBits" type="xmta:numOfKeyQBits" use=
"optional" default="8"/>
            <attribute name="keyValueQBits" type="xmta:numOfKeyValueQBits"
use="optional" default="16"/>
            <attribute name="preservingMode" type="xmta:preservingType" use
="optional" default=""KEY""/>
            <attribute name="dpcmMode_X" type="xmta:positionDpcmType" use
="optional" default="0"/>
            <attribute name="dpcmMode_Y" type="xmta:positionDpcmType" use
="optional" default="0"/>
            <attribute name="dpcmMode_Z" type="xmta:positionDpcmType" use
="optional" default="0"/>
            <attribute name="aacMode_X" type="xmta:aacType" use="optional"
default=""BINARY""/>
            <attribute name="aacMode_Y" type="xmta:aacType" use="optional"
default=""BINARY""/>
            <attribute name="aacMode_Z" type="xmta:aacType" use="optional"
default=""BINARY""/>
            <attribute name="linearKeycoder" type="xmta:linearKeycoderType"
use="optional" default=""LINEAR""/>
            <attribute name="intra_X"   type="xmta:intraType"   use="optional"
default="0"/>
            <attribute name="intra_Y" type="xmta:intraType" use="optional"
default="0"/>
            <attribute name="intra_Z" type="xmta:intraType" use="optional"
default="0"/>
        </complexType>
    </element>
    <element name="WaveletSubdivisionSurfaceEncodingParameter">
```

-continued

```
        </element>
        <element name="MeshGridEncodingParameter">
        </element>
      </choice>
      <attribute name="type" type="xmta:SFInt32" use="optional" default="0"/>
      <attribute name="buffer" type="xmta:SFString"  use="optional"/>
      <attribute name="url"   type="xmta:MFUrl" use="optional"/>
      <attributeGroup ref="xmta:DefUseGroup"/>
    <complexType>
  </element>
</schema>
```

1.2.2. Semantics

The "BitWrapper" node is a dedicated scheme for node compression. The representation of compressed data is transmitted in the BIFS stream or an external separate stream. When a stream is transmitted within a BIFS update, the "buffer" field contains representation of compressed data. If the stream is transmitted in a separate stream outside the BIFS update, the "url" field contains a URL of the stream. In lieu The "buffer" field and the "url" field are not compatible with each other. That is, the "url" field is not used during use of the "buffer" field, and vice versa. The "node" field includes a node that is representation of compressed data. The "BitWrapper" node can be used at a "node". The "type" field indicates that the scheme for node compression must be used. 0 is a default value of the "type" field. The value of the "type" field is determined in consideration of a possibility that a further scheme for node compression will be developed for the same node. The further possible scheme is defined as a default scheme.

The "CoordinateInterpolatorEncodingParameter" defines parameters for compression of vertex coordinates of an object in the keyframe-based animation data, i.e., Coordinate Interpolator node data. In this case, the "node" field is a "CoordinateInterpolator" node.

The "IndexedFaceSetEncodingParameter" defines parameters for compression of 3D mesh information, i.e., IndexedFaceSet node data. In this case, the "node" field is an "IndexedFaceSet" node.

The "OrientationInterpolatorEncodingParameter" defines parameters for compression of rotation information of an object in the keyframe-based animation data, i.e., Orientation Interpolator node data. In this case, the "node" field is an "OrientationInterpolator" node.

The "PositioninterpolatorEncodingParameter" defines parameters for compression of position information of an object in the keyframe-based animation data, i.e., PositionInterpolator node data. In this case, the "node" field is a "PositionInterpolator" node.

In case where parameters are not used during data compression, a file does not contain description of parameters. When data is compressed using parameters, each parameter field must be used exclusively since only one "node" field corresponds to only type of node data to be compressed and the parameter fields are grouped by a "<choice>" element. An "attribute" of each parameter field will be later described.

When representation of compressed data is included in a separate stream and transmitted, a node decoder must be presented in a predetermined frame.

In an object descriptor stream, node decoders must be defined in a DecoderConfig descriptor with respect to "streamType 0x03" and "objectTypeIndication 0x05". The decoder is configured with an AFXConfig descriptor.

1.3. numOfKeyQBits 1.3.1 Syntax

```
<simpleType name="numOfKeyQBits">
    <restriction base="int">
        <minInclusive value="0"/>
        <maxInclusive value="31"/>
    </restriction>
</simpleType>
```

1.3.2 Semantics numOfKeyQBits denotes an integer value indicating a quantization bit size of key data. The minimum and maximum values of numOfKeyQBits are 0 and 31, respectively.

1.4 numOfKeyValueQBits 1.4.1 Syntax

```
<simpleType name="numOfKeyValueQBits">
    <restriction base="int">
        <minInclusive value="0"/>
        <maxInclusive value="31"/>
    </restriction>
</simpleType>
```

1.4.2 Semantics numOfKeyValueQBits denotes an integer value indicating a quantization bit size of keyValue data. The minimum and maximum values of numOfKeyQBits are 0 and 31, respectively.

1.5 linearKeycoderType 1.5.1 Syntax

```
<simpleType name="linearKeycoderType">
    <restriction base="string">
        <enumeration value=""LINEAR""/>
        <enumeration value=""NOLINEAR""/>
    </restriction>
</simpleType>
```

1.5.2 Semantics linearKeycoderType is a string type and indicates whether a linear key coder is used or not.

1.6 preservingType
1.6.1 Syntax

```
<simpleType name="preservingType">
    <restriction base="string">
        <enumeration value=""KEY""/>
        <enumeration value=""PATH""/>
    </restriction>
</simpleType>
```

1.6.2 Semantics preservingType is a string type and indicates whether a current mode is a key preserving mode or a path preserving mode.

1.7 aacType
1.7.1 Syntax

```
<simpleType name="aacType">
    <restriction base="string">
        <enumeration value=""BINARY""/>
        <enumeration value=""UNARY""/>
    </restriction>
</simpleType>
```

1.7.2 Semantics aacType is a string type and indicates whether a current is BinaryAAC mode or a UnaryAAC mode with respect to keyValue components (X, Y, Z).

1.8 orientationDpcmType
1.8.1 Syntax

```
<simpleType name="orientationDpcmType">
    <restriction base="int">
        <enumeration value="1"/>
        <enumeration value="2"/>
    </restriction>
</simpleType>
```

1.8.2 Semantics orientationDpcmType denotes an integer value indicating the order of DPCM used with respect to the respective keyvalue components (X, Y, Z). If the degree of DPCM is 1, flags are set to 0. If the degree of DPCM is 2, the flags are set to 1.

1.9 positionDpcmType
1.9.1 Syntax

```
<simpleType name="positionDpcmType">
    <restriction base="int">
        <enumeration value="0"/>
        <enumeration value="1"/>
        <enumeration value="2"/>
    </restriction>
</simpleType>
```

1.9.2 Semantics positionDpcmType denotes an integer value indicating a degree of DPCM with respect to the respective keyValue components (X, Y, Z). If the degree of DPCM is 1, the flags are set to 0. If the degree of DPCM is 2, the flags are set to 1. When a SAD is use, the flags are set to 2.

1.10 intraType
1.10.1 Syntax

```
<simpleType name="intraType">
    <restriction base="int">
        <enumeration value="0"/>
        <enumeration value="1"/>
    </restriction>
</simpleType>
```

1.10.2 Semantics intraType is used for Position Interpolator Compression. IntraType denotes whether an intra coding mode is used with respect to the respective keyValue components (X,Y,Z).

1.11 transposeType
1.11.1 Syntax

```
<simpleType name="transposeType">
    <restriction base="string">
        <enumeration value=""ON""/>
        <enumeration value=""OFF""/>
    </restriction>
</simpleType>
```

1.11.2 Semantics transposeType denotes a flag for a transpose mode or a vertex mode. If the value is set to "ON", the transpose mode is used. Otherwise, the vertex mode is used.

1.12 numOfCoordQBits
1.12.1 Syntax

```
<simpleType name="numOfCoordQBits">
    <restriction base="int">
        <minInclusive value="1"/>
        <maxInclusive value="24"/>
    </restriction>
</simpleType>
```

1.12.2 Semantics numOfCoordQBits denotes a quantization step used for geometry. The minimum and maximum values of numOfCoordQBits are 1 and 24, respectively.

1.13 numOfNormalQBits
1.13.1 Syntax

```
<simpleType name="numOfNormalQBits">
    <restriction base="int">
        <minInclusive value="3"/>
        <maxInclusive value="31"/>
    </restriction>
</simpleType>
```

1.13.2 Semantics numOfNormalQBits denotes a quantization step for normals. The minimum and maximum values of numOfNormalQBits are 3 and 31, respectively.

1.14 numOfColorQBits
1.14.1 Syntax

```
<simpleType name="numOfColorQBits">
    <restriction base="int">
        <minInclusive value="1"/>
        <maxInclusive value="16"/>
```

1.14.2 Semantics numOfColorQBits denotes a quantization step for colors. The minimum and maximum values of numOfColorQBits are 1 and 16, respectively.

1.15 numOfrexCoordQBits
1.15.1 Syntax

```
<simpleType name="numOftexCoordQBits">
    <restriction base="int">
        <minInclusive value="1"/>
        <maxInclusive value="16"/>
    </restriction>
</simpleType>
```

1.15.2 Semantics

NumOftexGoordQBits denotes a quantization step for texture coordinates. The minimum and maximum values of NumOftexCoordQBits are 1 and 16, respectively.

1.16 coordPredType
1.16.1 Syntax

```
<simpleType name="coordPredType">
    <restriction base="int">
        <enumeration value="0"/>
        <enumeration value="2"/>
    </restriction>
</simpleType>
```

1.16.2 Semantics

CoordPredType denotes a type of prediction value used to reconstruct the vertex coordinates of the mesh. When no_prediction is used, CoordPredType is set to 1. When parallelogram_prediction is used, CoordPredType is set to 2.

1.17 normalPredType
1.17.1 Syntax

```
<simpleType name="normalPredType">
    <restriction base="int">
        <enumeration value="0"/>
        <enumeration value="1"/>
        <enumeration value="2"/>
    </restriction>
</simpleType>
```

1.17.2 Semantics

NormalPredType describes prediction of normal values. When no_prediction is selected, NormalPredType is set to 0. When tree_prediction is selected, NormalPredType is set to 1. When parallelogram_prediction is selected, NormalPredType is set to 2.

1.18 colorPredType
1.18.1 Syntax

```
<simpleType name="colorPredType">
    <restriction base="int">
        <enumeration value="0"/>
        <enumeration value="1"/>
        <enumeration value="2"/>
    </restriction>
</simpleType>
```

1.18.2 Semantics colorPredType describes how colors are predicted. When no_prediction is selected, colorpredType is set to 0. When tree_prediction is selected, colorPredType is set to 1. When parallelogram_prediction is used, colorPredType is set to 2.

1.19 texCoordPredType
1.19.1 Syntax

```
<simpleType name="texCoordPredType">
    <restriction base="int">
        <enumeration value="0"/>
        <enumeration value="2"/>
    </restriction>
</simpleType>
```

1.19.2 Semantics texCoordPredType describes prediction of colors. If no_prediction is selected, texCoordPredType is set to 0. If parallelogram_prediction is selected, texCoordPredType is set to 2.

1.20 errorResilienceType
1.20.1 Syntax

```
<simpleType name="errorResilienceType">
    <restriction base="string">
        <enumeration value=""ON""/>
        <enumeration value=""OFF""/>
    </restriction>
</simpleType>
```

1.20.2 Semantics

ErrorResilienceType is a value indicating whether an Error Resilience mode is used or not. If the Error Resilience mode is not used, the value is set to "OFF". If the Error Resilience mode is used, the value is set to "ON". Only when the value is set to "ON", boundaryPredictionType and bitsPerPacket are available.

1.21 boundaryPredictionType
1.21.1 Syntax

```
<simpleType name="boundaryPredictionType">
    <restriction base="int">
        <enumeration value="0"/>
        <enumeration value="1"/>
    </restriction>
</simpleType>
```

1.21.2 Semantics

BoundaryPredictionType denotes a value indicating the type of boundary prediction. If the value is 0, restricted prediction is used, and if the value is 1, extended prediction is used.

1.22 bitsPerPacket
1.22.1 Syntax

A "bitsPerPacket" syntax is the same as the type of SFInt32.

```
<simpleType name="SFInt32">
    <restriction base="int"/>
</simpleType>
```

1.22.2 Semantics

BitsPerPacket denotes a value indicating a packet size of an error resilient bitstream. The size of each partition in the error resilient mode is determined depending on the value. The type of bitsPerPacket is SFInt32. The default value is 360.

2. XMT-A Schema for BitWrapperEncodingHints
2.1. BitWrapperEncodingHints
2.1.1. Syntax A "BitWrapperEncodingHints" syntax is as follows:

```
<!-- Declaration of BitWrapperEncodingHints -->
<element name="StreamSource">
  <complexType>
    <choice minOccurs="0" maxOccurs="unbounded">
      <element ref="xmta:BitWrapperEncodingHints"/>
    </choice>
    ...
  </complexType>
</element>
...
<!-- Definition of BitWrapperEncodingHints -->
<element name="BitWrapperEncodingHints">
  <complexType>
    <element name="BitWrapper3DMCEncodingHints">
      <complexType>
        <sequence>
          <element name="sourceFormat">
            <complexType>
              <sequence>
                <element ref="xmta:param" minOccurs="0" maxOccurs="unbounded"/>
              </sequence>
            </complexType>
          </element>
          <element name="targetFormat">
            <complexType>
              <sequence>
                <element ref="xmta:param" minOccurs="0" maxOccurs="unbounded"/>
              </sequence>
            </complexType>
          </element>
        </sequence>
      </complexType>
    </element>
    <element name="BitWrapperICEncodingHints">
      <complexType>
        <sequence>
          <element name="sourceFormat">
            <complexType>
              <sequence>
                <element ref="xmta:param" minOccurs="0" maxOccurs="unbounded"/>
              </sequence>
            </complexType>
          </element>
          <element name="targetFormat">
            <complexType>
              <sequence>
                <element ref="xmta:param" minOccurs="0" maxOccurs="unbounded"/>
              </sequence>
            </complexType>
          </element>
        </sequence>
      </complexType>
    </element>
    <element name="OthersEncodingHints">
      ...
    </element>
  </complexType>
</element>
```

2.1.2. Semantics

BitWrapperEncodingHints is used to specify a "MuxInfo" description in a script (.mux) file. In this case, the format of BitWrapperEncodingHints is equivalent to that of the binary textual format. The "BitWrapper" node is used for an out-band scenario using the "ud" field in the "BitWrapper" node. BitWrapperEncodingHints defines a stream format type of the "MuxInfo" description.

3. Amendment to BitWrapperEncodingHints in XMT2MUX Style Sheet

In the XMT2MUX style sheet, an amendment to "Mux-Info" and "BitWrapperEncodingHints" syntax will now be described.

3.1 Syntax

The original "MuxInfo" and "BitWrapperEncodingHints" syntax is as follows:

```
<xsl:template match="xmt:StreamSource"> muxInfo {
fileName <xsl:value-of select="@url"/><xsl:text>
<!-- what to do for urls? -->
</xsl:text>
<!-- if no encoding hints are given, it is assumed the stream is of type
BIFS. otherwise the streamFormat should be declared in the
parameter element of sourceFormat or
targetFormat
(name 'streamFormat' and value corresponding to a
streamFormat recognised by
BIFSEnc) -->
<xsl:if test="not(xmt:EncodingHints)">streamFormat BIFS<xsl:text>
</xsl:text></xsl:if>
<xsl:apply-templates
select="xmt:EncodingHints|xmt:BIFSEncodingHints|xmt:FBAEncodingHints"/>
}
</xsl:template>
```

The amendment to the "MuxInfo" and "BitWrapperEncodingHints" syntax is as follows:

```
<xsl:template match="xmt:StreamSource"> muxInfo MuxInfo{
fileName <xsl:value-of select="@url"/>
<xsl:apply-templates
select="xmt:EncodingHints|xmt:BIFSEncodingHints|xmt:FBAEncodingHints|xmt:BitWrapperEncodingHints"/>
<xsl:if
test="not(xmt:EncodingHints|xmt:BitWrapperEncodingHints)">
streamFormat
BIFS<xsl:text>
</xsl:text></xsl:if>
<xsl:if test="xmt:BitWrapperEncodingHints"><xsl:text>
</xsl:text></xsl:if>
<xsl:apply-templates
select="xmt:BitWrapper3DMCEncodingHints|xmt:BitWrapperICEncodingHints|xmt:OthersEncodingHints"/>
}
<xsl:template match="xmt:BitWrapperEncodingHints">
<xsl:apply-templates
select="xmt:BitWrapper3DMCEncodingHints|xmt:
```

```
BitWrapperICEncodingHints|xmt:
OthersEncodingHints"/>
    <xsl:apply-templates select="xmt:sourceFormat|xmt:targetFormat"/>
  </xsl:template>
  <xsl:template match="xmt:BitWrapper3DMCEncodingHints">
    <xsl:apply-templates select="xmt:sourceFormat|xmt:targetFormat"/>
    streamFormat 3DMC<xsl:text>
    </xsl:text>
  </xsl:template>
  <xsl:template match="xmt:BitWrapperICEncodingHints">
    <xsl:apply-templates select="xmt:sourceFormat|xmt:targetFormat"/>
    streamFormat InterpolatorCompression<xsl:text>
    </xsl:text>
  </xsl:template>
  <xsl:template match="xmt:OthersEncodingHints">
    <xsl:apply-templates select="xmt:sourceFormat|xmt:targetFormat"/>
    streamFormat BIFS<xsl:text>
    </xsl:text>
  </xsl:template>
  <xsl:template match="xmt:sourceFormat">
    <xsl:apply-templates select="xmt:param"/>
  </xsl:template>
  <xsl:template match="xmt:targetFormat">
    <xsl:apply-templates select="xmt:param"/>
  </xsl:template>
```

3.2 Semantics

In the original syntax, the XMT2MUX style sheet does not sufficiently describe MUX information regarding a bitstream transmitted to an MP4 encoder. For instance, the name and types of the bitstream are not defined. Also, the XMT2MUX style sheet does not specify the information, such as the "bunny-15000-tcp.m3d" file of FIG. 6 and stream format, regarding a bitstream transmitted via an URL when the URL is defined in the "BitWrapper" node. Instead, the MT2MUX style describes the name of a file storing the bitstream and the type of the bitstream defined in the "BitWrapper" node. In detail, compression of 3D animation data is described in an InterpolatorCompression stream format, and compression of 3D mesh data is described in a 3DMC stream format.

4. Amendment to ObjectDescriptorUpdate 4.1 Syntax

An amendment to the "ObjectDescriptorUpdate" syntax in the XMT2BIFS style sheet will now be described.

The original "ObjectDescriptorUpdate" syntax is as follows:

```
<xsl:template match="xmt:ObjectDescriptorUpdate">
UPDATE OD [
<xsl:apply-templates select="xmt:OD"/>
]
</xsl:template>
```

An amended "ObjectDescriptorUpdate" syntax is as follows:

```
<xsl:template match="xmt:ObjectDescriptorUpdate">
UPDATE OD [
<xsl:apply-templates select="xmt:OD"/>
]
</xsl:template>
<xsl:template match="xmt:OD">
<xsl:apply-templates select="xmt:ObjectDescriptorBase"/>
</xsl:template>
```

```
<xsl:template match="xmt:ObjectDescriptorBase">
<xsl:apply-templates select="xmt:Object Descriptor|xmt:
InitialObjectDescriptor"/>
</xsl:template>
<xsl:template match="xmt:ObjectDescriptor">
ObjectDescriptor {
<xsl:if test="@objectDescriptorID">objectDescriptorID <xsl:value-of
select=
"@objectDescriptorID"/></xsl:if>
<xsl:text></xsl:text>
<xsl:apply-templates select="xmt:URL"/>
}
</xsl:template>
<xsl:template match="xmt:URL">
<xsl:if test="@URLstring">muxScript
<xsl:value-of select="@URLstring"/></xsl:if>
<xsl:text></xsl:text>
</xsl:template>
```

4.2 Semantics

In the original "ObjectDescriptorUpdate" syntax, "Update OD" contains no description. In the amended "ObjectDescriptorUpdate" syntax, "Update OD" is used when an author links a scene description stream (BIFS stream) to another element stream via the "url" field. Also, ObjectDescriptorID and a script file name are added into "Update OD". The format of the "ObjectDescriptorUpdate" syntax is equivalent to that of the binary textual format.

Hereinafter, an input file generating method and system using a meta language regarding graphics data compression, according to the present invention, will be described.

First, a method of compressing the original data into a bitstream using encoding parameters and transmitting the bitstream using a buffer, according to a preferred embodiment of the present invention, will be described with reference to FIGS. 2 and 4.

Figure 4:
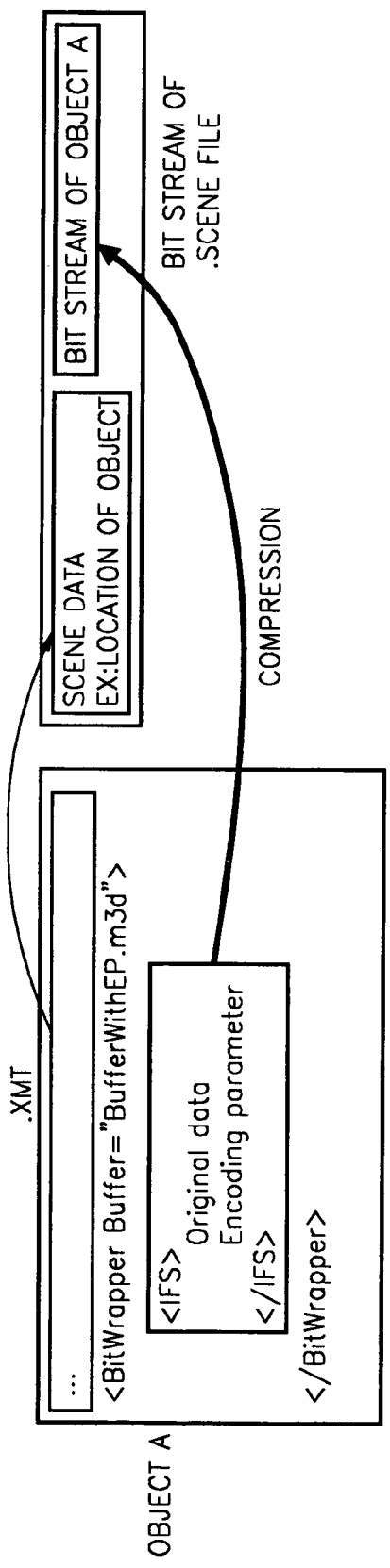
FIG. 4 illustrates compression of three-dimensional (3D) data regarding an object A into a bitstream using parameters and transmission of the bitstream using a "BufferWithEP.m3d" buffer.

FIG. 4 illustrates a case where 3D data, e.g., geometry information, connection information, and color information, regarding an object A such as a cup is compressed into a bitstream using parameters and the bitstream is transmitted to "BufferWithEP.m3d" using a buffer. As shown in FIG. 2, when an input XMT file is input to the XMT parser 210, the XMT parser 210 inserts a bitstream together scene data into a ".scene" file using XMT2BIFS and XMT2MUX style sheets, based on an XMT-A schema, and transmits the ".scene" file to the BIFS encoder. In this case, a ".mux" file contains a ".bifs/.od" file that describes a result of operating the BIFS Encoder that is the MPEG-4 Encoder. Also, when the information contained in the ".mux" stream and the ".bifs/.od" file are input to the MP4 Encoder, an ".mp4" file is generated. The ".mp4" file can be reproduced using the MPEG-4 Player (see the following Embodiment 1 for details).

[Embodiment 1]

An example of an XMT file that defines compression of 3D mesh information regarding the original data into a bitstream using a "BitWrapper" node and parameters and transmission of the bitstream using a buffer, is as follows:

```
<Header>
<InitialObjectDescriptor objectDescriptorID="1" binaryID="1">
    <Descr>
        <esDescr>
            <ES_Descriptor ES_ID="xyz" binaryID="201" OCR_ES_ID=
"xyz">
...
```

```
            <StreamSource>
                <BIFSEncodingHints>
                    <sourceFormat>
                        <param value="BufferWithEP.bif"> </param>
                    </sourceFormat>
                </BIFSEncodingHints>
            </StreamSource>
        </ES_Descriptor>
    </esDescr>
</Descr>
</InitialObjectDescriptor>
</Header>
...
<BitWrapper type="0" buffer="MyIndexFaceSet.m3d">
    <node>
        <IndexedFaceSet ccw="TRUE"    solid="TRUE"
                coordIndex="0, 1, 2, −1, 3, 4, 5, −1,..." normalPerVertex="
                TRUE">
            <coord DEF="Box-COORD"></coord>
            <Coordinate point="0 1 2, 0 2 3, 4 0 1, 1 5 4, 5 1 2, 2 6 5, ...">
            </Coordinate>
                <normal>
            <Normal vector="0.7859 −0.341 −0.5157, 0.3812 −0.801 0.4615, ...">
                </Normal></normal>
        </IndexedFaceSet>
    </node>
    <IndexedFaceSetEncodingParameter   coordQBits="10"
    normalQBits="9"                    coordPredMode="2"
    normalPredMode="0"                 errorResilience="OFF">
    </IndexedFaceSetEncodingParameter>
</BitWrapper>
...
```

If the XMT parser 210 receives the XMT file, of Embodiment 1, which defines representation of compressed 3D mesh information using the "BitWrapper" node and parameters, the XMT Parser 210 compresses the XMT file and generates a bitstream using parameters for compression of 3D mesh information which are defined in the "BitWrapper" node. The compression of the XMT file and generation of the bitstream are based on the XMT-A schema defining the "BitWrapper" node and the parameters. Also, the XMT-A schema, and the ".scene" and ".mux" files input to the MPEG-4 encoder are generated using the "XMT2BIFS" and "XMT2MUX" style sheets. As a result, the following files are obtained:

```
- "BufferWithEP.scene" File
    ...
    BitWrapper {
    node IndexedFaceSet {
            ccw="TRUE"
            solid="TRUE"
            coodIndex="0, 1, 2, −1, 3, 4, 5, −1, ..."
            normalPerVertex="TRUE"
        coord DEF Box-COORD Coordinate {
            point [0 1 2, 0 2 3, 4 0 1, 1 5 4, 5 1 2, 2 6 5, ...] }
        normal Normal {
            Vector[0.7859, −0.341, −0.5157, 0.3812, −0.801, 0.4615, ...]
        }
    }
    IndexedFaceSetEncodingParameter{
            coordQBits 10
            NormalQBits 9
            coordPredMode 2
            normalPredMode 0
            errorResilience OFF
    }
    type 0
    buffer "MyIndexFaceSet.m3d"
    }
    ...
```

```
- "BufferWithEP.mux" File
    InitialObjectDescriptor {
        ...
        muxInfo MuxInfo{
            fileName "BufferWithEP.bif"
            streamFormat BIFS
        }
    }
```

The above ".scene" and ".mux" files are input to the MPEG-4 player and pass through the BIFS encoder 250, a ".bifs/.od" file is generated. Then, the ".bifs/.od" file and the ".mux" file are input to the MP4 encoder 260, and an ".mp4" bitstream is generated. Finally, the ".mp4" file is visualized in a screen of the MPEG-4 player.

Second, a method of transmitting the original data using an already-compressed bitstream using a buffer, will be described with reference to FIGS. 2 and 5.

Figure 5:
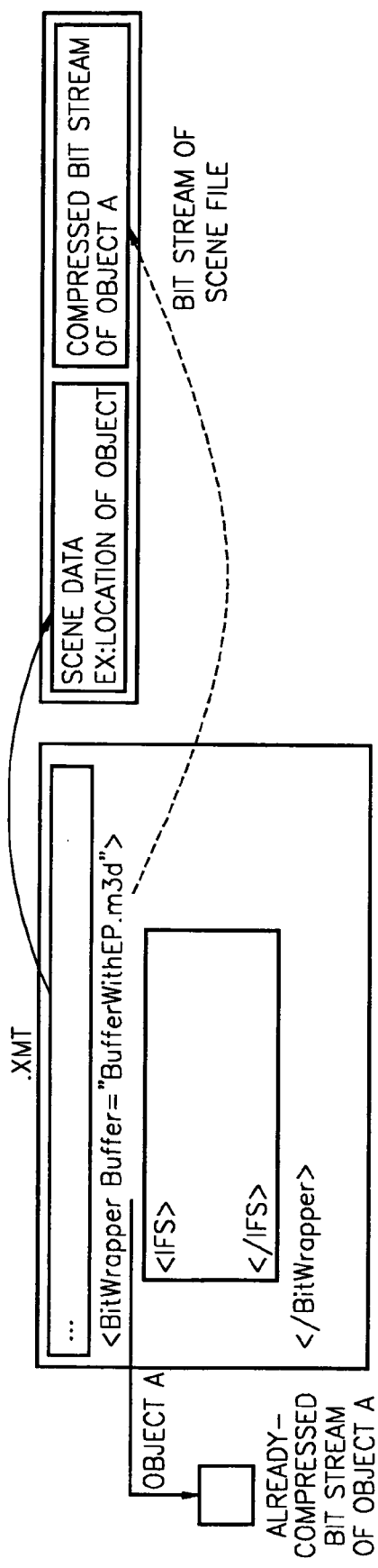
FIG. 5 illustrates transmission of 3D data using an already-compressed bitstream and a buffer.

Referring to FIG. 5, 3D data, e.g., geometry information, connection information, and color information, regarding an object A such as a cup has already been compressed into a bitstream and the bitstream is transmitted to "BufferWithoutEP.m3d" via the buffer, compared to the first case where the original data is compressed into a bitstream using parameters and 3D data regarding the object A, which are defined in the "BitWrapper" node specified in the input XMT file, the bitstream is transmitted using the buffer.

As illustrated in FIG. 2, upon receiving the XMT file 200, the XMT parser 210 inserts the already-compressed bitstream together with scene data into a ".scene" bitstream using the XMT2MUX and XMT2BIFS style sheets 220 and 230, based on the XMT-A schema 240, and transmits the ".scene" bitstream. In this case, a ".mux" file contains a ".bits/.od" file that is generated by the BIFS encoder 250 that is the MPEG-4 encoder. Further, the ".Mux" and ".bifs/.od" files are input to the MP4 encoder 260, a final ".mp4" file is generated and visualized by the MPEG-4 player. An embodiment of a method of transmitting the original data using an already-compressed bitstream using a buffer is disclosed in Embodiment 2.

[Embodiment 2]

An example of an XMT file describing transmission of the already-compressed bitstream representation of 3D mesh information as defined in the "BitWrapper" node, is as follows:

```
...
    <Header>
        <InitialObjectDescriptor objectDescriptorID="1" binaryID="1"
        >
        <Descr>
            <esDescr>
                <ES_Descriptor ES_ID="xyz" binaryID="201" OCR_
                ES_ID="xyz">
                ...
                <StreamSource>
                    <BIFSEncodingHints>
                        <sourceFormat>
                            <param value="BufferWithoutEP.
                            bif"> </param>
                        </sourceFormat>
                    </BIFSEncodingHints>
                </StreamSource>
                </ES_Descriptor>
            </esDescr>
        </Descr>
```

-continued

```
        </InitialObjectDescriptor>
    </Header>
    <Body>
    <Replace>
    <Scene>
        <Group>
            <children>
                <Shape>
                    <geometry DEF="MY_BOX">
                    <BitWrapper type="0" buffer="MyIndexFaceSet.
                    m3d">
                        <node>
                            <IndexedFaceSet>
                            <coord DEF="Box-COORD"></coord>
                            <Coordinate></Coordinate>
                        <node>
                        </BitWrapper>
                    </geometry>
                </Shape>
            </children>
        </Group>
    </Scene>
    </Replace>
    </Body>
...
```

As disclosed in Embodiment 2, upon receiving an XMT file defining transmission of the already-compressed bitstream, which is representation of the 3D mesh information, using the buffer as defined in the "BitWrapper" node, the XMT parser 210 generates a bitstream, which is representation of compressed 3D mesh information, to be transmitted using a buffer defined in the "BitWrapper" node. The generation of the bitstream is based on the XMT-A schema defining the "BitWrapper" node and parameters. Also, ".scene" and ".mux" files input to the MPEG-4 encoder are generated using the XMT-A schema and the XMT2BIFS and XMT2MUX styles sheets 230 and 220, as follows:

```
- BufferWithoutEP.scene File
    ...
    BitWrapper {
        node                                    IndexedFaceSet
        {
            coord DEF Box-COORD Coordinate {
            }
        }
        type 0
        buffer "MyIndexFaceSet.m3d"
    }
    ...
- BufferWithoutEP.mux File
    InitialObjectDescriptor {
    ...
    muxInfo MuxInfo{
        fileName "BufferWithoutEP.bif"
        streamFormat BIFS
    }
}
```

The ".scene" and ".mux" files are input to the MPEG-4 encoder and passes through the BIFS encoder 250, a ".bifs/.od" file is generated. The ".bifs/.od" file (or, bitstream?) and the "mux" file are input to the MP4 encoder 260, an ".mp4" bitstream is obtained. The "mp4" file is visualized in a screen of the MPEG-4 player.

Third, an embodiment of a method of compressing the original data into a bitstream using parameters and transmitting the bitstream using a URL will be described with reference to FIGS. 2 and 6.

FIG. 6 illustrates a method of compressing 3D data, such as geometry information, connection information, and color information, regarding an object A, e.g., a cup, into a bitstream using parameters and transmitting the bitstream via a URL, as defined in the "BitWrapper" node. This method is different from a method of compressing 3D data into a bitstream and transmitting the bitstream via a buffer. More specifically, in this method, an ud ID, e.g., 12, is defined in the "BitWrapper" node, a "BitWrapperEncodingHints" with an ObjectDescriptorID such as the url ID specifies the location of a compressed bitstream representation of the 3D data regarding the object A, a "bunny-15000-tcp .m3d" file, and the compressed bitstream is transmitted based on the "BitWrapperEncodingHints" field. Next, the information regarding the location of the compressed bitstream representation of the 3D data is included in information regarding the location of a ".mux" file. The location information regarding the ".mux" file is described in an "ObjectDescriptorUpdate" that is a url ID of the "BitWrapper" node. The location information regarding the ".mux" file is linked to the location information, i.e., a "bunny-15000-tcp .m3d" file, regarding the compressed bitstream representation of the 3D data of the object A. The location information regarding the compressed bitstream representation of the 3D data is linked to the compressed bitstream representation of the 3D data. Accordingly, a bitstream representation of the "bunny-15000-tcp.m3d" file is transmitted via the URL.

When the method of FIG. 6 is specified in the input XMT file 200 of FIG. 2 and input to the XMT parser 210, the XMT parser 210 inserts the location information regarding the ".mux" file together with scene data into a ".scene" bitstream using the XMT2BIFS and XMT2MUX style sheets 230 and 220 based on the XMT-A schema 240, and transmits the ".scene" bitstream. The ".mux" file contains a ".bifs/.od" file generated by the BIFS encoder 250 that is included in the MPEG-4 encoder. Also, ".mux" file contains the "bunny-15000-tcp.m3d" file specifying the location of the bitstream that is representation of the 3D data regarding the object A.

When the location information regarding the bitstream representation of the 3D data, which is specified in the ".mux" file, and the ".bifs/.od" file are input to the MP4 encoder 260, an ".mp4" file, which is a bitstream file, is generated and displayed in a screen of the MPEG-4 player.

The method of FIG. 6 will be described in a greater detail with respect to Embodiment 3.

[Embodiment 3]

An example of an XMT file describing compression of 3D mesh information regarding the original data using parameters and transmission of the bitstream via the URL as defined in the "BitWrapper" node, is as follows:

```
<Header>
...
<ObjectDescriptor objectDescriptorID="12" binaryID="12">
    <Descr>
        <esDescr>
            <ES_Descriptor ES_ID="PI" binaryID="211" OCR_ES_ID=
            "PIC">
            ...
            <StreamSource>
                <BitWrapperEncodingHints>
                    <BitWrapper3DMCEncodingHints>
                        <sourceFormat>
                            <paramvalue="bunny-15000-tcp.m3d"> </param>
                        </sourceFormat>
                    </BitWrapper3DMCEncodingHints>
```

```
        </BitWrapperEncodingHints>
      </StreamSource>
     </ES_Descriptor>
    </esDescr>
   </Descr>
  </ObjectDescriptor>
 </Header>
 <Body>
  <Replace>
   <Scene>
    <Group>
     <children>
      <Shape>
       <geometry DEF="MY_BOX">
        <Box size="69"></Box>
        <BitWrapper type="0" url="12">     <node>
         <IndexedFaceSet    ccw="TRUE"
              solid="TRUE"
              coordIndex="0,1,2,-1,3,4,5,-1, ..."
              normalPerVertex="TRUE">
          <coord DEF="Box-COORD"></coord>
          <Coordinate point="012,023,401,154,512,265, ...">
          </Coordinate>
            <normal>
             <Normal vector="0.7859 -0.341 -0.5159, 0.3821
    -0.801 0.4615, ..."> </Normal>
            </normal>
         </IndexedFaceSet>
<node>
         </IndexedFaceSetEncodingParameter coordQits="10"
              normalQBits="9"
              coordPreMode="2"
              normalPredMode="0"
              errorResilience="OFF">    </IndexedFaceSe
EncodingParameter>
        </BitWrapper>
       </geometry>
      </Shape>
     </children>
    </Group>
   </Scene>
  </Replace>
  <ObjectDescriptorUpdate>
   <OD>
    <ObjectDescriptorBase>
     <ObjectDescriptor objectDescriptorID="12" binaryID="12">
<URL URLstring="UrlWithEP.mux"></URL>
    </ObjectDescriptor>
     </ObjectDescriptorBase>
    </OD>
  </ObjectDescriptorUpdate>
</Body>
```

In the method of Embodiment 3, upon receiving the XMT file describing compression of 3D mesh information using parameters as defined in the "BitWrapper" node, the XMT parser 210 compresses the 3D mesh information into the bitstream using parameters as defined the "BitWrapper" node. The generation of the bitstream is based on the XMT-A schema defining the "BitWrapper" node and the parameters. Also, ".scene" and ".mux" files, which are input to the MPEG-4 encoder, are generated using the XMT-A schema and the "XMT2BIFS" and "XMT2MUX" style sheets, as follows:

```
- UrlWithEP.scene File
    ...
    BitWrapper {
        node IndexedFaceSet {
        ccw TRUE
            coordIndex [0, 1, 2, -1, 3, 4, 5, -1, ...]
        normalPerVertex TRUE
        solid TRUE
```

```
            coord DEF Box-COORD Coordinate {
                point[012, 023, 401, 154, 512, 265, ...]
            }
            normal Normal {
                vector [0.7859, -0.341, -0.5159, 0.3821, -0.801,
                0.4651, ...]
            }
        }
        IndexedFaceSetEncodingParameter {
            coordQBits 10
            normalQBits 9
            coordPredMode 2
            normalPredMode 0
            errorResilience OFF
        }
        type 0
        url 12
    }
    ...
    UPDATE OD [
        ObjectDescriptor {
            objectDescriptorID 12
            muxScript UrlWithEP.mux
        }
    ]
- "UrlWithEP.mux" File
    ...
    ObjectDescriptor {
    objectDescriptorID 12
    esDescr [
        ES_Descriptor {
        ES_ID 211
        ...
        muxInfo MuxInfo{
        fileName "bunny-15000-tcp.m3d"
        streamFormat 3DMC
        }
        ]
    }
```

When the ".scene" and ".mux" files are input to the MPEG-4 encoder and pass through the BIFS encoder 250, a ".bifs/.od" file is generated. Then, the ".bifs/.od" and ".mux" files are input to the MP4 encoder 260, thus obtaining an ".mp4" bitstream file is generated. The obtained "mp4" file is displayed on a screen of the MPEG-4 player.

Fourth, a method of transmitting the original data using an already-compressed bitstream via the URL, according to a preferred embodiment of the present invention, is described with reference to FIGS. 2 and 7.

FIG. 7 illustrates a method of transmitting an already-compressed bitstream that is representation of 3D data, such as geometry information, connection information, and color information, regarding an object A, e.g., a cup, via an URL as defined in the "BitWrapper" node. The difference between the method of FIG. 7 and a method of transmitting the bitstream via a buffer is described with respect to the third method in which the original data is compressed into a bitstream using parameters and the bitstream is transmitted using the URL. Also, the method of FIG. 7 is different from the third method in that the 3D data is transmitted via the URL using the already compressed bitstream that is representation of the 3D data. Accordingly, the input XMT file 200 of FIG. 2 only describes a url ID other than the original data and parameters in the "BitWrapper" node.

The method of FIG. 7 will now be more particularly described with respect to Embodiment 4.

[Embodiment 4]

An example of an XMT file describing transmission of an already-compressed bitstream that is representation of 3D mesh information as defined in the "BitWrapper" node via the URL is as follows:

```
<Header>
...
<ObjectDescriptor objectDescriptorID="12" binaryID="12">
  <Descr>
    <esDescr>
      <ES_Descriptor ES_ID="PI" binaryID="211" OCR_ES_ID=
      "PIC">
        <StreamSource>
          <BitWrapperEncodingHints>
            <BitWrapper3DMCEncodingHints>
              <sourceFormat>
                <param value="bunny-15000-tcp.m3d"> </param>
              </sourceFormat>
            </BitWrapper3DMCEncodingHints>
          </BitWrapperEncodingHints>
        </StreamSource>
      </ES_Descriptor>
    </esDescr>
  </Descr>
</ObjectDescriptor>
</Header>
<Body>
  <Replace>
    <Scene>
      <Group>
        <children>
          <Shape>
                          <geometry DEF="MY_BOX">
            <BitWrapper type="0" url="12">
              <node>
                <IndexedFaceSet>
                  <coord DEF="Box-COORD"></coord>
                  <Coordinate> </Coordinate>
                </IndexedFaceSet>              </node>
            </BitWrapper>
          </geometry>              </Shape>
        </children>
      </Group>
    </Scene>
  </Replace>
  <ObjectDescriptorUpdate>
    <OD>
      <ObjectDescriptorBase>
        <ObjectDescriptor objectDescriptorID="12" binaryID="12">
          <URL URLstring="UrlWithoutEP.mux">
          </URL>
        </ObjectDescriptor>
      </ObjectDescriptorBase>
    </OD>
  </ObjectDescriptorUpdate>
</Body>
```

In the method of Embodiment 4, upon receiving the XMT file describing transmission of the already-compressed bitstream, which is representation of 3D mesh information, using the URL as defined in the "BitWrapper" node, the XMT parser 210 generates a bitstream that is representation of compressed 3D information, the bitstream being transmitted using the URL specified in the "BitWrapper" node. The generation of the bitstream is based on definitions in the XMT-A schema 240 defining the "BitWrapper" node and parameters. Also, ".scene" and ".mux" files, which are to be input to the MPEG-4 encoder, are generated using the XMT-A schema and XMT2BIFS and XMT2MUX style sheets, as follows:

```
- URLWithoutEP.scene File
    ...
    BitWrapper {
    node IndexedFaceSet {
    coord DEF Box-COORD Coordinate {
        }
    }
        type 0
        url 12
    }
    ...
    UPDATE OD [
    ObjectDescriptor {
        objectDescriptorID 12
        muxScript UrlWithoutEP.mux
    }
    ]
- URLWithoutEP.mux File
    ...
    ObjectDescriptor {
        objectDescriptorID 12
        esDescr [
            ES_Descriptor {
                ES_ID 211
            ...
                muxInfo MuxInfo{
                    fileName "bunny-15000-tcp.m3d"
                    streamFormat 3DMC
    }
    ...
```

The above ".scene" and ".mux" files are input to the MPEG-4 encoder. The ".scene" file is input to the BIFS encoder 250 to generate a ".bifs/.od" file. The ".bifs/.od" and ".mux" files are input to the MP4 encoder 260 to generate an ".mp4" bitstream file. The ".mp4" bitstream file is displayed as the 3D data on a screen of the MPEG-4 player.

An input file generation method and system using a meta language regarding graphics data compression, according to the present invention, allows an author to easily use and compress 3D data with the meta language during authoring 3D contents. In particular, according to the present invention, the author can select a method of compressing data and control data compression. Whether data is compressed or not can be determined by representation of the metal language. Also, a data compression format can be determined by representation of the metal language, for example, depending on encoding parameters and selection of an in-band/out-band scenario According to the present invention, it is easy to manufacture authoring tools using XML-based MPEG-4 primitives. 2D or 3D contents manufacture using the authoring tools can be reused in applications of various platforms. Further, since the present invention allows an author to compress 3D data during an authoring process, it is possible to visualize graphics data or animation data in real time even at a low network bandwidth. Also, the author can manufacture various types of 3D graphics data.

The present invention can be embodied as a code, which can be read by a computer or information processing apparatuses, in a computer readable medium. Here, the computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method of generating an input file using a meta language regarding graphics data compression, the method comprising:
    making an extensible markup language (XML) schema that defines at least a compression node describing object data to be compressed, and parameters used for data compression;
    making style sheets which support conversion of an input XML file into a file, which is to be input to a data compression encoder, based on the XML schema;
    generating the file, which is to be input to the data compression encoder, by parsing the input XML file based on the XML schema and the style sheets; and
    inputting the generated file to the data compression encoder to generate an encoded bitstream of compressed graphics data.

2. The method of claim 1, wherein the XML schema further defines EncodingHints specifying the location of a file in which the object data to be compressed is stored.

3. The method of claim 1, wherein the parameters comprise at least one of a parameter for keyframe-based animation data regarding vertex coordinates of the object, a parameter for rotation information of the object, a parameter for position information of the object to be compressed, and a parameter for three-dimensional (3D) mesh information to be compressed.

4. The method of claim 2, wherein the parameters comprise at least one of a parameter for keyframe-based animation data regarding vertex coordinates of the object, a parameter for rotation information of the object, a parameter for position information of the object to be compressed, and a parameter for three-dimensional (3D) mesh information to be compressed.

5. A method of generating an input file using a meta language regarding graphics data compression, the method comprising:
    making an XMT schema which defines a compression node describing object data to be compressed, parameters for data compression, and BitWrapperEncodingHints which at least specifies a location of a file in which the object data to be compressed is stored;
    making an XMT2BIFS style sheet which supports conversion of an XMT input file into a scene file and an XMT2MUX style sheet which supports conversion of the XMT input file into a mux file, based on the XMT schema;
    generating the scene file and the mux file by parsing the input XMT file using the XMT schema and the XMT2BIFS and XMT2MUX style sheets, respectively; and
    inputting the generated scene file and mux file to a data compression encoder to generate an encoded bitstream of compressed graphics data.

6. The method of claim 5, wherein the compression node comprises:
    a node field comprising the object data to be compressed;
    a buffer field which temporarily stores a bitstream defined in the compression node using an in-band scenario; and
    a URL field which links information regarding the bitstream defined in the compression node using an out-band scenario,
    wherein either the buffer field or the URL field is used.

7. The method of claim 6, wherein the compression node further comprises a type field specifying a type of node compression scheme.

8. The method of claim 5, wherein the parameters comprise at least one of a parameter for keyframe-based animation data regarding vertex coordinates of the object, a parameter for rotation information of the object, a parameter for position information of the object to be compressed, and a parameter for three-dimensional (3D) mesh information to be compressed.

9. The method of claim 5, wherein the BitWrapperEncodingHints further specifies an object descriptor ID that is the same as a URL ID of the compression node, a name of a file transmitting a compressed bitstream, and a type of a stream format, wherein the file name is described in the mux file.

10. The method of claim 5, wherein parsing the input XMT file further comprises:
    receiving the input XMT file describing the compression node that defines the original data, compression parameters, and buffer; and
    generating the scene file and the mux file by parsing the input XMT file using the XMT schema and the XMT2BIFS and XMT2MUX style sheets, respectively,
    wherein the scene file comprises the object data to be compressed, the data compression parameters, and a buffer which temporarily stores a bitstream obtained from compression of the original data, and
    the mux file describes a name of a file obtained by encoding the scene file using a BIFS encoder and a stream format.

11. The method of claim 5, wherein parsing the input XMT file further comprises:
    receiving the input XMT file defining the compression node comprising a buffer temporarily storing the compressed object data; and
    generating the scene file and the mux file by parsing the input XMT file using the XMT schema and the XMT2BIFS and XMT2MUX style sheets, respectively,
    wherein the scene file comprises the buffer temporarily storing a bitstream that is a representation of the compressed object data, and
    the mux file specifies a name of a file obtained by encoding the scene file using a BIFS encoder, and a stream format.

12. The method of claim 5, wherein parsing the input XMT file comprises:
    receiving the input XMT file which describes the compression node defining the object data to be compressed, the data compression parameters, and URL information, and the BitWrapperEncodingHints defining an object descriptor ID that is the same as a URL ID of the compression node and a location of a bitstream that is a representation of the compressed object data; and
    generating the scene file and the mux file by parsing the input XMT file using the XMT schema and the XMT2BIFS and XMT2MUX style sheets, respectively,
    wherein the scene file comprises the object data to be compressed, the data compression parameters, and the URL information which links information regarding a bitstream obtained from compression of the object data, and
    the mux file specifies the location of the bitstream, which is a representation of the compressed object data, and a stream format defined in the BitWrapperEncodingHints.

13. The method of claim 12, wherein the input XMT file further comprises an ObjectDescriptorUpdate which defines an object descriptor ID that is the same as the object descriptor ID specified in the BitWrapperEncodingHints, and a name of a the mux file to be generated from the parsing of the input XMT file, wherein the scene file further specifies the object descriptor ID that is the same as the object descriptor ID specified in the BitWrapperEncodingHints, and the name of the mux file.

14. The method of claim 5, wherein parsing the input XMT file further comprises:

receiving the input XMT file describing the BitWrapperEncodingHints specifying the compression node defining a URL which links information regarding already-compressed object data, an object descriptor ID that is the same as a URL ID, and a location of a bitstream that is a representation of the compressed object data; and generating the scene file and the mux file by parsing the input XMT file using the XMT schema and the XMT2BIFS and XMT2MUX style sheets, respectively, wherein the scene file comprises the URL which links information regarding the bitstream obtained from the compression of the object data and whose ID is the same as the ID of the object descriptor specified in the compression node, and the mux file specifies the location of the bitstream that is a representation of the compressed object data defined in the BitWrapperEncodingHints and a stream format.

15. The method of claim 14, wherein the input XMT file further comprises an ObjectDescriptorUpdate which specifies an object descriptor ID that is the same as the object descriptor ID defined in the BitWrapperEncodingHints and a name of the mux file obtained by the parsing of the input XMT file, wherein the scene file further specifies the object descriptor ID that is the same as the object descriptor ID defined in the BitWrapperEncodingHints and the name of the mux file.

16. A computer readable recording medium for recording a program executing the method of claim 1 in a computer.

17. A computer readable recording medium for recording a program executing the method of claim 5 in a computer.

18. A system for generating an input file using a meta language regarding graphics data compression, the system comprising:

a processing unit which provides an XML schema that defines a compression node comprising at least information regarding object data to be compressed and parameters used for data compression;

a processing unit which provides style sheets which support conversion of an input XML file into a file which is to be input to a predetermined data compression encoder, based on the XML schema; and an XML parser which parses the input XML file based on the XML schema and the style sheets to generate the file which is to be input to a predetermined data compression encoder.

19. The system of claim 18, wherein the parameters comprise at least one of a parameter for keyframe-based animation data regarding vertex coordinates of the object, a parameter for rotation information of the object, a parameter for position information of the object, and a parameter for three-dimensional (3D) mesh information to be compressed.

20. A system for generating an input file using a meta language regarding graphics data compression, the system comprising:

a processing unit which provides an XMT schema which defines a compression node specifying object data to be compressed, parameters for data compression, and BitWrapperEncodingHints which at least specifies a location of a file in which the object data to be compressed is stored;

a processing unit which provides an XMT2BIFS style sheet which supports conversion of an in put XMT file into a scene file based on the XMT schema;

a processing unit which provides an XMT2MUX style sheet which supports conversion of the input XMT file into a mux file based on the XMT schema; and an XMT parser which parses the input XMT file based on the XMT schema and the XMT2BIFS and XMT2MUX style sheets to generate the scene and mux files, respectively, as the input files to a predetermined compression encoder.

21. The system of claim 20, wherein the compression node comprises:

a node field specifying the object data to be compressed;

a buffer field which transmits a bitstream that is a representation of the compressed object data using an in-band scenario, the bitstream being specified in the compression node; and a URL field which transmits the bitstream that is a representation of the compressed object data using an out-band scenario, the bitstream being specified in the compression node, wherein the compression node uses either the buffer field or the URL field.

22. The system of claim 20, wherein the parameters comprise at least one of a parameter for keyframe-based animation data regarding vertex coordinates of the object, a parameter for rotation information of the object, a parameter for position information of the object, and a parameter for three-dimensional (3D) mesh information to be compressed.

23. The system of claim 20, wherein the BitWrapperEncoding Hints further comprises an object descriptor ID that is the same as a URL ID defined in the compression node, a name of a file transmitting a compressed bitstream contained in the mux file, and a type of a stream format.

24. A method of generating an input file using meta representation of graphics data compression, the method comprising:

making an extensible MPEG-4 textual format (XMT) schema which defines a compression node describing object data to be compressed, parameters for data compression, and BitWrapperEncodingHints which at least specifies a location of a file in which the object data to be compressed is stored;

receiving an XMT input file;

generating a file to be input to a data compression encoder by parsing the input XMT file using information including the XMT schema; and inputting the generated file to the data compression encoder to generate an encoded bitstream of compressed graphics data, wherein the compression node comprises:

a node field containing the object data to be compressed;

a buffer field which is not used together with a URL field at the same time and temporarily stores a bitstream defined in the compression node using an in-band scenario;

the URL field which is not used together with the buffer field at the same time and links information regarding the bitstream defined in the compression node using an out-band scenario; and a type field specifying a type of node compression scheme, wherein the parameters comprise at least one of a parameter for keyframe-based animation data regarding vertex coordinates of the object, a parameter for rotation information of the object, a parameter for position information of the object to be compressed, and a parameter for three-dimensional (3D) mesh information to be compressed, and wherein the BitWrapperEncodingHints further specifies an object descriptor ID that is the same as a URL ID of the compression node, a name of a file transmitting a compressed bitstream, and a type of a stream format, the file name being described in a mux file.

25. A method of transmitting an input file generated using meta representation of graphics data compression, the method comprising:

making an extensible MPEG-4 textual format (XMT) schema which defines a compression node describing object data to be compressed, parameters for data compression, and BitWrapperEncoding Hints which at least specifies a location of a file in which the object data to be compressed is stored;

receiving an XMT input file;

generating a file to be input to a data compression encoder by parsing the input XMT file using information including the XMT schema; and if the compression node of the XMT input file contains information about already-compressed object data and a buffer temporarily storing the already-compressed object data, transmitting a bitstream of compressed graphics data that is a representation of the already-compressed object data by using the buffer, wherein the compression node comprises:

a node field containing the object data to be compressed;

a buffer field which is not used together with a URL field at the same time and temporarily stores a bitstream defined in the compression node using an in-band scenario;

the URL field which is not used together with the buffer field at the same time and links information regarding the bitstream defined in the compression node using an out-band scenario; and a type field specifying a type of node compression scheme, wherein the parameters comprise at least one of a parameter for keyframe-based animation data regarding vertex coordinates of the object, a parameter for rotation information of the object, a parameter for position information of the object to be compressed, and a parameter for three-dimensional (3D) mesh information to be compressed, and wherein the BitWrapperEncodingHints further specifies an object descriptor ID that is the same as a URL ID of the compression node, a name of a file transmitting a compressed bitstream, and a type of a stream format, the file name being described in a mux file.

26. A method of transmitting an input file generated using meta representation of graphics data compression, the method comprising:

making an extensible MPEG-4 textual format (XMT) schema which defines a compression node describing object data to be compressed, parameters for data compression, and BitWrapperEncodingHints which at least specifies a location of a file in which the object data to be compressed is stored;

receiving an XMT input file;

generating a file to be input to a data compression encoder by parsing the input XMT file using information including the XMT schema; and if the compression node of the XMT input file contains information about already-compressed object data and a URL which links information regarding the already-compressed object data, transmitting a bitstream of compressed graphics data that is a representation of the already-compressed object data by using the URL, wherein the compression node comprises:

a node field containing the object data to be compressed;

a buffer field which is not used together with a URL field at the same time and temporarily stores a bitstream defined in the compression node using an in-band scenario;

the URL field which is not used together with the buffer field at the same time and links information regarding the bitstream defined in the compression node using an out-band scenario; and a type field specifying a type of node compression scheme, wherein the parameters comprise at least one of a parameter for keyframe-based animation data regarding vertex coordinates of the object, a parameter for rotation information of the object, a parameter for position information of the object to be compressed, and a parameter for three-dimensional (3D) mesh information to be compressed, and wherein the BitWrapperEncodingHints further specifies an object descriptor ID that is the same as a URL ID of the compression node, a name of a file transmitting a compressed bitstream, and a type of a stream format, the file name being described in a mux file.

27. A method of transmitting an input file generated using meta representation of graphics data compression, the method comprising:

making an extensible MPEG-4 textual format (XMT) schema which defines a compression node describing object data to be compressed, parameters for data compression, and BitWrapperEncodingHints which at least specifies a location of a file in which the object data to be compressed is stored;

receiving an XMT input file;

generating a file to be input to a data compression encoder by parsing the input XMT file using information including the XMT schema; and if the compression node of the XMT input file contains information about original data, compression parameters and a buffer, transmitting a bitstream of compressed graphics data by using the buffer, wherein the bitstream is obtained by compressing the original data using the compression parameters, wherein the compression node comprises:

a node field containing the object data to be compressed;

a buffer field which is not used together with a URL field at the same time and temporarily stores a bitstream defined in the compression node using an in-band scenario;

the URL field which is not used together with the buffer field at the same time and links information regarding the bitstream defined in the compression node using an out-band scenario; and a type field specifying a type of node compression scheme, wherein the parameters comprise at least one of a parameter for keyframe-based animation data regarding vertex coordinates of the object, a parameter for rotation information of the object, a parameter for position information of the object to be compressed, and a parameter for three-dimensional (3D) mesh information to be compressed, and wherein the BitWrapperEncodingHints further specifies an object descriptor ID that is the same as a URL ID of the compression node, a name of a file transmitting a compressed bitstream, and a type of a stream format, the file name being described in a mux file.

28. A method of transmitting an input file generated using meta representation of graphics data compression, the method comprising:

making an extensible MPEG-4 textual format (XMT) schema which defines a compression node describing object data to be compressed, parameters for data compression, and BitWrapperEncodingHints which at least specifies a location of a file in which the object data to be compressed is stored;

receiving an XMT input file;

generating a file to be input to a data compression encoder by parsing the input XMT file using information including the XMT schema; and if the compression node of the XMT input file contains information about original data, compression parameters, and a URL, transmitting a bitstream of compressed graphics data by using the URL, wherein the bitstream is obtained by compressing the original data using the compression parameters, wherein the compression node comprises:

a node field containing the object data to be compressed;

a buffer field which is not used together with a URL field at the same time and temporarily stores a bitstream defined in the compression node using an in-band scenario;

the URL field which is not used together with the buffer field at the same time and links information regarding the bitstream defined in the compression node using an out-band scenario; and a type field specifying a type of node compression scheme, wherein the parameters comprise at least one of a parameter for keyframe-based animation data regarding vertex coordinates of the object, a parameter for rotation information of the object, a parameter for position information of the object to be compressed, and a parameter for three-dimensional (3D) mesh information to be compressed, and wherein the BitWrapperEncodingHints further specifies an object descriptor ID that is the same as a URL ID of the compression node, a name of a file transmitting a compressed bitstream, and a type of a stream format, the file name being described in a mux file.

29. A method of generating an extensible MPEG-4 textual format (XMT) schema for use in meta representation of graphics data compression, the method comprising:

defining a compression node which includes information regarding object data to be compressed;

defining an encoding parameter required for data compression;

defining BitWrapperEncodingHints which at least specifies a location of a file in which the object data to be compressed is stored; and storing the compression node, the encoding parameter, and the BitWrapperEncodingHints as the XMT schema, wherein the compression node comprises:

a node field containing the object data to be compressed;

a buffer field which is not used together with a URL field at the same time and temporarily stores a bitstream defined in the compression node using an in-band scenario;

the URL field which is not used together with the buffer field at the same time and links information regarding the bitstream defined in the compression node using an out-band scenario; and a type field specifying a type of node compression scheme, wherein the parameters comprise at least one of a parameter for keyframe-based animation data regarding vertex coordinates of the object, a parameter for rotation information of the object, a parameter for position information of the object to be compressed, and a parameter for three-dimensional (3D) mesh information to be compressed, and wherein the BitWrapperEncodingHints further specifies an object descriptor ID that is the same as a URL ID of the compression node, a name of a file transmitting a compressed bitstream, and a type of a stream format, the file name being described in a mux file.

30. A system of generating an input file using meta representation of graphics data compression, the system comprising:

a processing unit which provides an extensible MPEG-4 textual format (XMT) schema for defining a compression node describing object data to be compressed, parameters for data compression, and BitWrapperEncodingHints which at least specifies a location of a file in which the object data to be compressed is stored; and an XMT parser which generates a file to be input to a data compression encoder by parsing an input XMT file using information including the XMT schema, wherein the compression node comprises:

a node field containing the object data to be compressed;

a buffer field which is not used together with a URL field at the same time and temporarily stores a bitstream defined in the compression node using an in-band scenario;

the URL field which is not used together with the buffer field at the same time and links information regarding the bitstream defined in the compression node using an out-band scenario; and a type field specifying a type of node compression scheme, wherein the parameters comprise at least one of a parameter for keyframe-based animation data regarding vertex coordinates of the object, a parameter for rotation information of the object, a parameter for position information of the object to be compressed, and a parameter for three-dimensional (3D) mesh information to be compressed, and wherein the BitWrapperEncodingHints further specifies an object descriptor ID that is the same as a URL ID of the compression node, a name of a file transmitting a compressed bitstream, and a type of a stream format, the file name being described in a mux file.

31. The system of claim 30, wherein, if the compression node of the XMT input file contains information about already-compressed object data and a buffer temporarily storing the already-compressed object data, the encoder transmits a bitstream that is a representation of the already-compressed object data by using the buffer.

32. The system of claim 30, wherein, if the compression node of the XMT input file contains information about already-compressed object data and a URL which links information regarding the already-compressed object data, the encoder transmits a bitstream that is a representation of the already-compressed object data by using the URL.

33. The system of claim 30, wherein, if the compression node of the XMT input file contains information about original data, compression parameters, and a buffer, the encoder transmits a bitstream by using the buffer, wherein the bitstream is obtained by compressing the original data using the compression parameters.

34. The system of claim 30, wherein, if the compression node of the XMT input file contains information about original data, compression parameters, and a URL, the encoder transmits a bitstream by using the URL, wherein the bitstream is obtained by compressing the original data using the compression parameters.

* * * * *